US011847507B1

(12) United States Patent
Borkovic

(10) Patent No.: US 11,847,507 B1
(45) Date of Patent: Dec. 19, 2023

(54) DMA SYNCHRONIZATION USING ALTERNATING SEMAPHORES

(71) Applicant: Amazon Technologies, Inc., Seattle, WA (US)

(72) Inventor: Drazen Borkovic, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 17/247,180

(22) Filed: Dec. 2, 2020

(51) Int. Cl.
   *G06F 9/52* (2006.01)
   *G06F 13/28* (2006.01)

(52) U.S. Cl.
   CPC .............. *G06F 9/52* (2013.01); *G06F 13/28* (2013.01)

(58) Field of Classification Search
   None
   See application file for complete search history.

(56) References Cited

U.S. PATENT DOCUMENTS

| | | | |
|---|---|---|---|
| 4,725,946 A | 2/1988 | Prange et al. | |
| 5,590,378 A | 12/1996 | Thayer et al. | |
| 6,055,583 A | 4/2000 | Robbins | |
| 6,725,457 B1 | 4/2004 | Priem et al. | |
| 7,454,588 B2 * | 11/2008 | Greicar | G06F 9/44521 |
| | | | 711/171 |
| 8,773,852 B2 * | 7/2014 | Singleton | H05K 7/20836 |
| | | | 361/679.48 |
| 8,891,392 B2 * | 11/2014 | Cook | H04L 43/0852 |
| | | | 370/252 |
| 9,081,501 B2 * | 7/2015 | Asaad | G06F 15/76 |
| 10,664,282 B1 * | 5/2020 | Minkin | G06F 9/52 |
| 10,691,775 B2 * | 6/2020 | van Rooyen | G16H 10/60 |
| 11,221,979 B1 * | 1/2022 | Borkovic | G06N 3/045 |
| 2002/0010814 A1 * | 1/2002 | Barry | G06F 13/126 |
| | | | 710/22 |
| 2007/0255923 A1 * | 11/2007 | Greicar | G06F 12/08 |
| | | | 711/171 |
| 2011/0219208 A1 * | 9/2011 | Asaad | G06F 9/06 |
| | | | 712/12 |

(Continued)

OTHER PUBLICATIONS

U.S. Appl. No. 17/247,016, filed Nov. 24, 2020, Drazen Borkovic.
Notice of Allowance, dated Sep. 9, 2021; U.S. Appl. No. 17/247,016.

*Primary Examiner* — Henry Tsai
*Assistant Examiner* — Christopher A Bartels
(74) *Attorney, Agent, or Firm* — Weaver Austin Villeneuve & Sampson LLP

(57) ABSTRACT

Two or more semaphores can be used per queue for synchronization of direct memory access (DMA) transfers between a DMA engine and various computational engines by alternating the semaphores across sequential sets of consecutive DMA transfers in the queue. The DMA engine can increment a first semaphore after performing each DMA transfer of a first set of consecutive DMA transfers and a second semaphore after performing each DMA transfer of a second set of consecutive DMA transfers that is after the first set of consecutive DMA transfers in the queue. Each semaphore can be reset when all the computational engines that are dependent on the respective set of consecutive DMA transfers are done waiting on the given semaphore before performing respective operations. After reset, the first semaphore or the second semaphore can be reused for the next set of consecutive DMA transfers in the queue.

20 Claims, 9 Drawing Sheets

(56) References Cited

U.S. PATENT DOCUMENTS

| | | | |
|---|---|---|---|
| 2012/0137075 A1* | 5/2012 | Vorbach | G06F 9/526 |
| | | | 711/E12.024 |
| 2013/0342993 A1* | 12/2013 | Singleton | H05K 7/20836 |
| | | | 361/690 |
| 2013/0343207 A1* | 12/2013 | Cook | H04L 43/0852 |
| | | | 370/252 |
| 2020/0073830 A1* | 3/2020 | Verrilli | G06N 3/105 |
| 2020/0250545 A1* | 8/2020 | Verrilli | G06N 3/10 |
| 2020/0364088 A1* | 11/2020 | Ashwathnarayan | G06F 9/5016 |
| 2022/0075842 A1* | 3/2022 | Bhaskaracharya | G06F 17/16 |
| 2022/0180766 A1* | 6/2022 | Aharonson | G09B 15/00 |

* cited by examiner

DMA SYNCHRONIZATION USING ALTERNATING SEMAPHORES

BACKGROUND

In computer systems, multiple agents may execute concurrently to perform different operations. An agent can be an integrated circuit that can perform certain operations sequentially based on the system architecture. Generally, multiple agents can execute autonomously in parallel but periodically they may need to synchronize certain operations. As an example, in a neural network processor, multiple agents may include various computational engines and direct memory access (DMA) engines executing in parallel to perform different operations. The computational engines can be used to perform different neural network computations such as pooling, activation, convolution, among other operations. In most instances, an agent may consume data produced by another agent, or an agent may need to use memory space currently reserved for another agent. Semaphores can be used to provide synchronization when multiple agents need to access a shared resource. A hardware semaphore may provide a simpler and more cost-effective solution for synchronization than certain software primitives.

BRIEF DESCRIPTION OF THE DRAWINGS

Various embodiments in accordance with the present disclosure will be described with reference to the drawings, in which.

DETAILED DESCRIPTION

Figure 1:
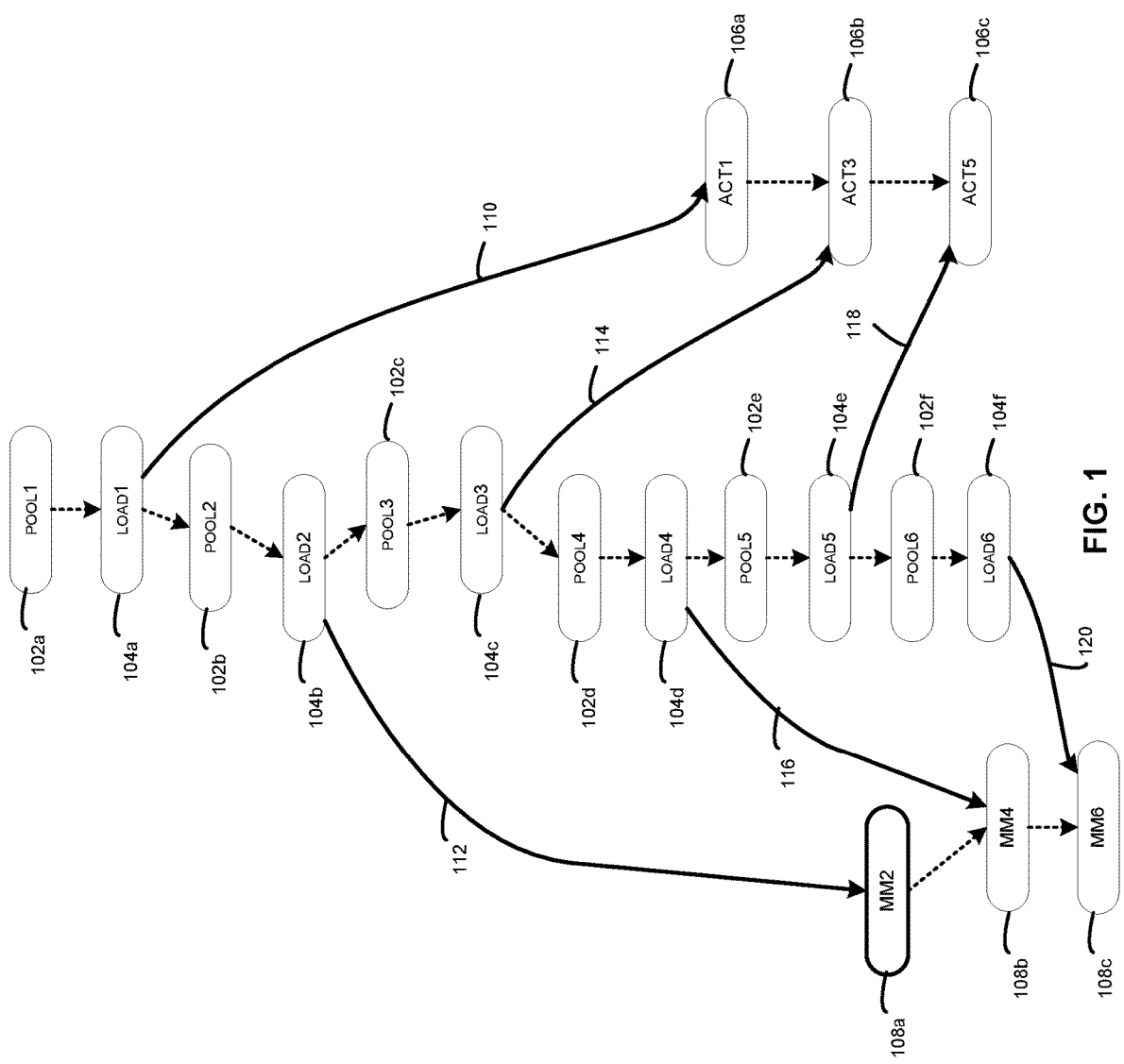
FIG. 1 illustrates an example neural network graph which can be used to describe certain embodiments.

An artificial neural network (also called a neural network) is generally a set of algorithms modeled loosely after the human brain, which can be used to recognize underlying relationships or patterns in an input dataset through a process that mimics the way a human brain operates. Neural networks can be trained to learn about how to perform a certain computing task such as image recognition, speech recognition, computer vision, text processing, search queries, among others. A neural network can be represented using a neural network graph comprising different types of operations to be performed on the input dataset. Each operation may be represented by a node in the graph and the result of one operation can feed another node thus forming a hierarchical tree. As an example, for a convolutional neural network (CNN) the operations may include convolution, pooling, activation, and normalization.

The neural network graph can be used to generate a neural network model that can be compiled using a compiler to generate machine level instructions for execution by different components of a neural network processor. Each operation of the neural network graph can be expanded into one or more instructions by the compiler. For example, the convolution operation may be expanded into multiple matrix multiplication (MM) instructions. In this specification, the terms "operation" and "instruction" can be used interchangeably. The neural network processor may include a pooling engine, an activation engine, a processing engine (PE) array, and one or more DMA engines, which may execute their respective instructions to perform pooling operations, activation operations, MM operations, and DMA operations respectively. Each DMA engine can be used to perform DMA operations to transfer data for different computational engines using a queue. For example, a DMA transfer may be used to load data from a host memory into a local buffer for consumption by the PE array, or to store data computed by the activation engine from the local buffer to the host memory. In certain instances, spilling may occur due to the small size of the local buffer, high number of data transfers for a large neural network, or imperfections in the memory allocator, which can increase the number of DMA transfers.

Semaphores can be used to perform synchronization between DMA transfers on the DMA engine and the computational engines. A semaphore can be a register with 8-bits, 16 bits, 32 bits or another suitable size. In certain implementations, one semaphore can be assigned per DMA queue. As an example, a pooling engine can trigger one or more DMA transfers on the DMA queue using the DMA engine. The DMA engine may perform the DMA transfers and increment the semaphore value after completion of each DMA transfer. The activation engine may wait for the semaphore to reach a threshold value before performing an activation operation. For example, the semaphore reaching a threshold value may imply that the semaphore has been incremented to a specific value after completion of a first DMA transfer. The activation engine may exit the wait state to perform the activation operation using a portion of the data from the completed DMA transfer. Similarly, a PE array may be dependent on a second DMA transfer and wait on another value of the semaphore indicating completion of the second DMA transfer before performing an MM operation. Thus, the DMA engine can perform consecutive DMA transfers and increment the semaphore value after completing each DMA transfer to indicate to the computing engines waiting on respective values of the semaphore completion of the respective DMA transfer.

The above method can be used to perform synchronization of the DMA transfers effectively using a single semaphore per DMA queue. However, the number of DMA transfers that can be performed using the single semaphore may be limited by the maximum value of the semaphore. For example, with a 16-bit semaphore initialized to 0, each DMA transfer can increment the semaphore value all the way up to its maximum value of 65,535. Therefore, for large neural networks requiring more than 65,535 DMA transfers, the 16-bit semaphore may be limited in range. The semaphore value cannot be wrapped around since it may result in a deadlock or blocking of one or more computational engines that may be waiting on a specific value of the semaphore. Thus, for large number of DMA transfers that is higher than the maximum value of a given semaphore, use of a single semaphore may be limiting. For example, the large number of DMA transfers may occur due to large amounts of data to be processed for a neural network, or spilling of the local buffer.

Another method to solve the above problem can utilize two or more DMA queues such that each queue can process a portion of the DMA transfers. However, a very large neural network requiring double the amount of DMA transfers may encounter the same problem of exceeding the range of the semaphore. Therefore, there is a need to optimize DMA synchronization of large number of DMA transfers with semaphores having limited range.

Certain embodiments can be used to optimize DMA synchronization of large number of DMA transfers using two or more semaphores for each DMA queue that processes a higher number of DMA transfers than the range of a single semaphore. The two or more semaphores can be used alternatively across sequential sets of consecutive DMA transfers in the queue in a round-robin or another predetermined order. Each set of consecutive DMA transfers can include number of DMA transfers that is less than the maximum value of a given semaphore. Each semaphore can be reset after a respective set of consecutive DMA transfers has been completed which can allow reuse of the semaphore for another set of consecutive DMA transfers. Alternating and resetting of the semaphores for each DMA queue can provide an optimized solution for DMA synchronization independently of the size of the neural network.

In certain embodiments, a neural network processor can execute instructions to perform DMA synchronization for DMA transfers across different engines. The instructions can be generated by a compiler based on a neural network graph that includes operations to be performed by different engines and dependencies between the operations. As an example, a computational engine may trigger sequential DMA transfers including a first set of consecutive DMA transfers that is followed by a second set of consecutive DMA transfers. A first semaphore can be assigned to the first set of consecutive DMA transfers and a second semaphore can be assigned to the second set of consecutive DMA transfers. The first set of consecutive DMA transfers may include number of DMA transfers that is less than or equal to the maximum value of the first semaphore, and the second set of consecutive DMA transfers may include number of DMA transfers that is less than or equal to the maximum value of the second semaphore.

The first semaphore and the second semaphore can be both initialized to 0. The first semaphore value can be incremented by 1 after completing each DMA transfer of the first set of consecutive DMA transfers, and the second semaphore value can be incremented by 1 after completing each DMA transfer of the second set of consecutive DMA transfers. The first semaphore can be assigned again to a third set of consecutive DMA transfers that is followed by the second set of consecutive DMA transfers, but only after the first semaphore has been reset again before starting the third set of consecutive DMA transfers. Similarly, the second semaphore can be assigned again to a fourth set of consecutive DMA transfers that is followed by the third set of consecutive DMA transfers, but only after the second semaphore has been reset again before starting the fourth set of consecutive DMA transfers.

However, the first semaphore can be reset only after all the instructions that wait on the DMA transfers incrementing the first semaphore have been completed, and the second semaphore can be reset only after all the instructions that wait on the DMA transfers incrementing the second semaphore have been completed. In certain embodiments, each instruction waiting on a certain DMA transfer can compare the assigned semaphore value to a threshold value to determine whether that DMA transfer has completed. The first semaphore can be reset by the computational engine after triggering all the consecutive DMA transfers for the second set, which can provide enough time to all the instructions waiting on the DMA transfers incrementing the first semaphore to complete. Similarly, the second semaphore can be reset by the computing engine after triggering all the consecutive DMA transfers for the third set, which can provide enough time to all the instructions waiting on the DMA transfers incrementing the second semaphore to complete. Thus, the use of the first semaphore and the second semaphore can be alternated for synchronization of each set of consecutive DMA transfers using the same queue without exceeding their respective maximum values.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example neural network graph 100 which can be used to describe certain embodiments. The neural network graph 100 can be part of a larger neural network graph for a neural network. The neural network graph 100 may include different types of operations that can be performed given an input dataset. Each operation may be represented by a node in the neural network graph 100 and can be executed by an engine in a neural network processor. The input dataset may correspond to an image, text, audio, video or another type of data. As an example, the operations may include convolution, pooling, activation, normalization, load, or store. The edges in the neural network graph 100 may represent dependencies between the operations and may require synchronization since the output data of one node may be used as an input data to the next node.

The neural network graph 100 can be used to generate a neural network model, which can be compiled by a host system using a compiler to generate compiled code. The compiled code may include machine level instructions that can be executed by different components of a neural network processor, e.g., a pooling engine, an activation engine, a processing engine (PE) array, and a DMA engine. As an example, operations 102a-102f and 104a-104f may be performed by the pooling engine, operations 106a-106c may be performed by the activation engine, and operations 108a-108c may be performed by the PE array. Note that the neural network graph 100 may include additional or different nodes for other operations which are not shown here for the purposes of simplicity.

The pooling engine may perform pooling operations POOL1 102a, POOL2 102b, POOL3 102c, POOL4 102d, POOL5 102e, and POOL6 102f sequentially. The pooling operations can be used to perform mean, average, or maximum pooling to reduce the spatial dimensions of a given dataset. Output data computed from each pooling operation can be consumed by the activation engine or the PE array using DMA transfers. For example, each load operation LOAD1 104*a*, LOAD2 104*b*, LOAD3 104*c*, LOAD4 104*d*, LOAD5 104*e* or LOAD6 104*f* can trigger a DMA engine to perform a DMA transfer using a queue. The load operations 104*a*-104*f* may be used to load data from memory to be used by other engines for neural network computations. Note that the pooling engine may perform other operations before, after or in-between the operations 102*a*-102*f* or 104*a*-104*f*.

The activation engine may be dependent on completion of a certain DMA transfer before performing an operation. As shown by an edge 110 in FIG. 1, the activation engine may wait for the DMA transfer triggered by the LOAD1 operation 104*a* to finish before performing an ACT1 operation 106*a*. Similarly, as shown by an edge 114, the activation engine may wait for the DMA transfer triggered by the LOAD3 operation 104*c* to finish before performing an ACT3 operation 106*b*. As shown by an edge 118, the activation engine may wait for the DMA transfer triggered by the LOAD5 operation 104*e* to finish before performing an ACT5 operation 106*c*. The activation operations 106*a*-106*c* may be performed by the activation engine for non-linear transformation of the input data. Note that the activation engine may perform other operations before, after or in-between the operations 106*a*-106*c*.

Similarly, the PE array may wait for a specific DMA transfer to finish before performing certain operations. For example, as shown by an edge 112, the PE array may wait for the DMA transfer triggered by the LOAD2 operation 104*b* to finish before performing an MM2 operation 108*a*. Similarly, as shown by an edge 116, the PE array may wait for the DMA transfer triggered by the LOAD4 operation 104*d* to finish before performing an MM4 operation 108*b*. As shown by an edge 120, the PE array may wait for the DMA transfer triggered by the LOAD6 operation 104*f* to finish before performing an MM6 operation 108*c*. The MINI operations 108*a*-108*c* may be performed by the PE array for convolution computations. Note that the PE array may perform other operations before, after or in-between the operations 108*a*-108*c*.

Synchronization between various engines executing different operations may be needed because of their inter-dependency as shown by the edges 110, 112, 114, 116, 118, and 120 in the neural network graph 100. A semaphore may be used to synchronize the DMA transfers among different engines so that the PE array or the activation engine does not execute an instruction until a specific DMA transfer is finished. For example, the PE array or the activation engine may need to perform an operation on some data which may only be available upon completion of a certain DMA transfer. In another example, an operation performed by the pooling engine may free up some memory space which may be used by the PE array to write its output. Use of the semaphore for synchronization is described with reference to FIG. 2.

Figure 2:
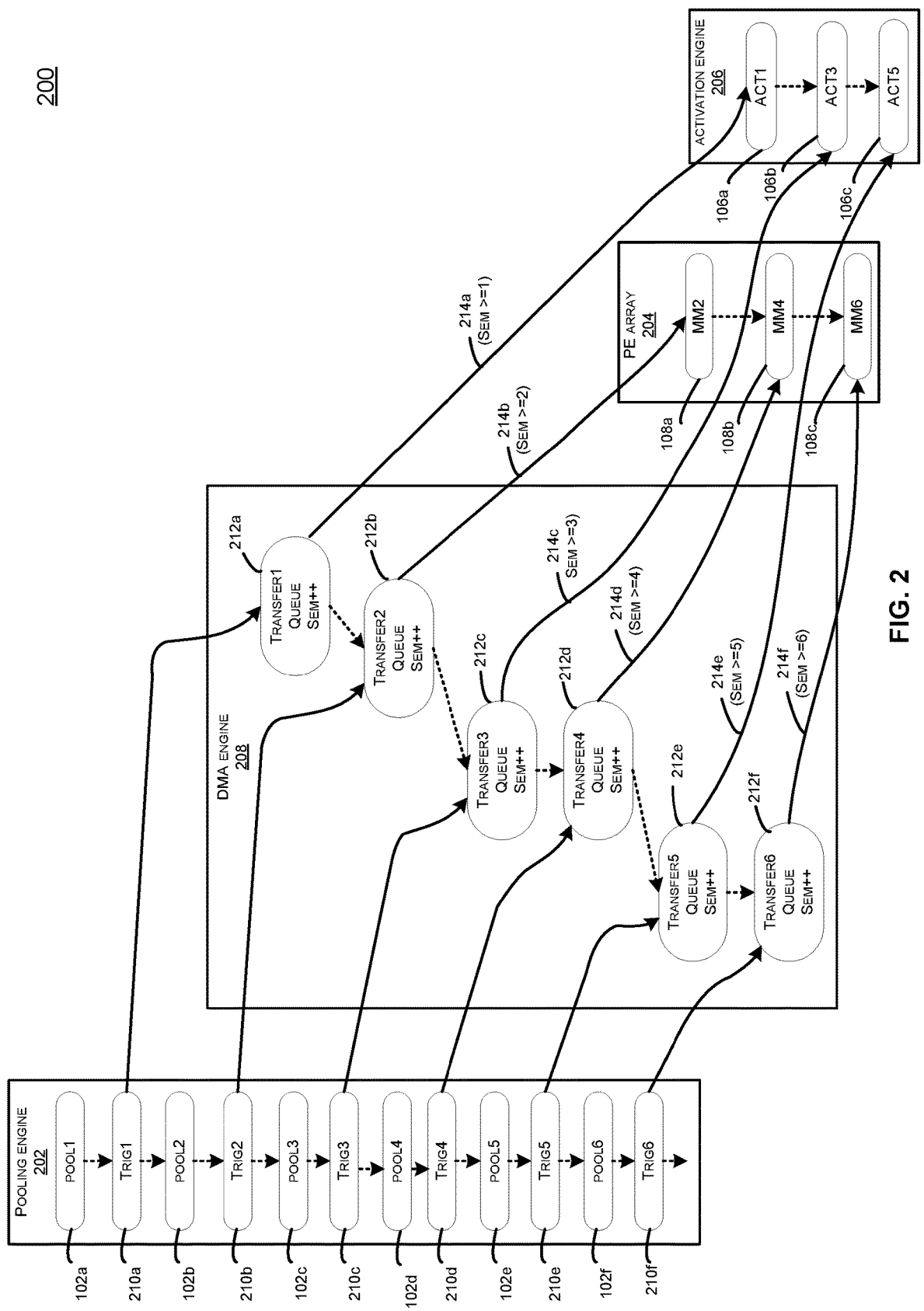
FIG. 2 illustrates an apparatus which can be used to describe synchronization between different operations in the neural network graph using a semaphore.

FIG. 2 illustrates an apparatus 200 which can be used to describe synchronization between different operations in the neural network graph 100 using a semaphore. The apparatus 200 may include a pooling engine 202, a PE array 204, an activation engine 206 and a DMA engine 208. The apparatus 200 may be part of a neural network processor configured to execute neural network computations for training or inference operations associated with a neural network.

The pooling engine 202 may be configured to perform pooling operations 102*a*-102*f* as discussed with reference to FIG. 1. The LOAD operations 104*a*-104*f* discussed with reference to FIG. 1 can be represented using respective trigger operations 210*a*-210*f* in FIG. 2. For example, a TRIG1 operation 210*a* may trigger a first DMA transfer 212*a* using a queue in the DMA engine 208. Similarly, a TRIG2 operation 210*b* may trigger a second DMA transfer 212*b*, a TRIG3 operation 210*c* may trigger a third DMA transfer 212*c*, a TRIG4 operation 210*d* may trigger a fourth DMA transfer 212*d*, a TRIG5 operation 210*e* may trigger a fifth DMA transfer 212*e*, and a TRIG6 operation 210*f* may trigger a sixth DMA transfer 212*f* using the same queue. Note that the pooling engine 202 may perform the operations 102*a*, 210*a*, 102*b*, 210*b*, 102*c*, 210*c*, 102*d*, 210*d*, 102*e*, 210*e*, 102*f*, and 210*f* sequentially, and therefore no synchronization may be needed between the operations performed by the pooling engine 202.

The DMA engine 208 may execute instructions to perform DMA operations for sequential consecutive DMA transfers 212*a*-212*f* using a single queue. In certain examples, one logical queue may be mapped to one physical queue. In some implementations, a semaphore (or Sem) may be used by the neural network processor for synchronization of DMA transfers and the computing engines. As an example, the Sem value may be incremented by the DMA engine 208 after performing each DMA transfer. The Sem may be initialized to 0 before starting an inference or training operation. The DMA engine 208 may increment the Sem value to 1 after performing the first DMA transfer 212*a*, to 2 after performing the second DMA transfer 212*b*, to 3 after performing the third DMA transfer 212*c*, to 4 after performing the fourth DMA transfer 212*d*, to 5 after performing the fifth DMA transfer 212*e*, and to 6 after performing the sixth DMA transfer 212*f*. The DMA operations may be performed based on DMA descriptors provided in the instructions. For example, the DMA descriptors may include information associated with the semaphore, source address, destination address, transfer size, and any other relevant data.

The activation engine 206 may be configured to perform activation operations 106*a*-106*c* sequentially, and the PE array 204 may be configured to perform MM operations 108*a*-108*c* sequentially, as discussed with reference to FIG. 1. The PE array 204 or the activation engine 206 may wait for the semaphore to reach a respective threshold value to determine that the respective DMA transfer has completed. In this specification, a semaphore reaching a threshold value may imply that the semaphore value has become greater than or equal to the threshold value. As shown by an edge 214*a*, the activation engine 206 may wait for the Sem value to be greater than or equal to 1 before performing the ACT1 operation 106*a*. Similarly, as shown by an edge 214*b*, the PE array 204 may wait for the Sem value to be greater than or equal to 2 before performing the MM2 operation 108*a*. As shown by an edge 214*c*, the activation engine 206 may wait for the Sem value to be greater than or equal to 3 before performing the ACT3 operation 106*b*. Similarly, as shown by an edge 214*d*, the PE array 204 may wait for the Sem value to be greater than or equal to 4 before performing the MM4 operation 108*b*. As shown by an edge 214*e*, the activation engine 206 may wait for the Sem value to be greater than or equal to 5 before performing the ACT5 operation 106*c*. Similarly, as shown by an edge 214*f*, the PE array 204 may wait for the Sem value to be greater than or equal to 6 before performing the MM6 operation 108*c*.

Note that instead of waiting for the Sem to be equal to a specific value, greater than or equal to that specific value is used in case the Sem value has become higher while the waiting engine is still executing a previous instruction or otherwise busy. The DMA engine 208 may increment the Sem value after completing each DMA transfer regardless of whether an engine waiting for a specific Sem value is ready to use the results of that DMA transfer. For example, in certain instances, the activation engine 206 may not be ready to perform the ACT1 operation 106a when the Sem value becomes 1; however, the DMA engine 208 may start performing the second DMA transfer 212b and increment the Sem value to 2 after completing the second DMA transfer 212b. When the activation engine 206 gets ready to perform the ACT1 operation 106a, the Sem value may have become 2 but the activation engine 206 may still be waiting for the Sem value to be 1 and not perform the ACT1 operation 106a. Therefore, waiting for greater than or equal to the specific value can allow the activation engine 206 to exit the wait state and perform the ACT1 operation 106a even after the Sem value has increased to 2 since the PE array 204 and the activation engine 206 may be able to execute concurrently.

As discussed with reference to FIG. 2, with the use of a semaphore, concurrent execution of the pooling engine 202, DMA engine 208, PE array 204 and/or the activation engine 206 can be synchronized using a single DMA queue. However, the number of DMA transfers that can increment the semaphore value may be limited based on the size of the semaphore. This may be a problem especially for large neural networks requiring a high number of DMA transfers due to spilling, or large amounts of data to be moved around. Embodiments can be used to optimize DMA synchronization among the engines using two or more semaphores per DMA queue as discussed with reference to FIG. 3.

Figure 3:
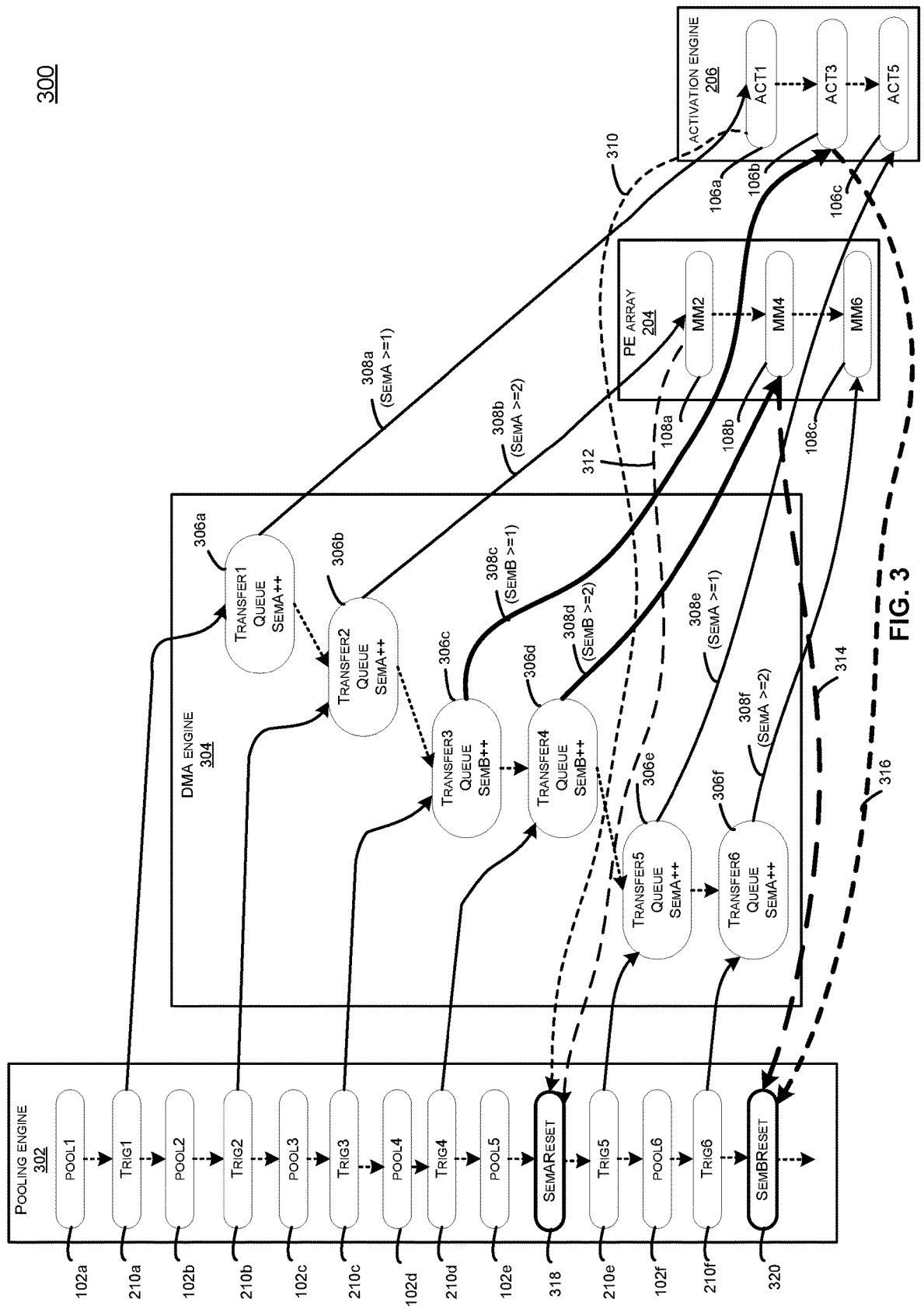
FIG. 3 illustrates an apparatus which can be used to provide DMA synchronization among different engines using alternating semaphores, according to certain embodiments.

FIG. 3 illustrates an apparatus 300 which can be used to provide DMA synchronization among different engines using alternating semaphores, according to certain embodiments.

The apparatus 300 may be part of a neural network processor configured to perform neural network computations for training or inference operations associated with a neural network. The operations performed by different engines and their inter-dependencies can be represented using a neural network graph, like the neural network graph 100. A compiler can generate machine level instructions based on the neural network graph, which can be executed by different components of the apparatus 300 to perform certain embodiments. For example, the apparatus 300 may include a pooling engine 302, PE array 204, activation engine 206 and a DMA engine 304, which can execute instructions to perform different operations of the neural network.

According to certain embodiments, two or more semaphores can be used to perform synchronization of sets of consecutive DMA transfers in a DMA queue. As shown in FIG. 3, a first semaphore SemA can be assigned to a DMA queue in the DMA engine 304 for a first set of consecutive DMA transfers comprising a transfer1 306a and a transfer 2 306b. Similarly, a second semaphore SemB can be assigned to the same DMA queue in the DMA engine 304 for a second set of consecutive DMA transfers comprising a transfer3 306c and a transfer 4 306d. The second set of consecutive DMA transfers may be subsequent to the first set of consecutive DMA transfers in the DMA queue. The transfer1 306a, transfer2 306b, transfer3 306c, and transfer4 306d may be triggered by the pooling engine 302 by executing respective TRIG operations 210a, 210b, 210c, and 210d, as discussed with reference to FIG. 2. The semaphores SemA and SemB can be initially reset to 0 or another suitable value. Each of SemA and SemB can be registers of any suitable size such as 8-bits, 16-bits, 32-bits, or more. Note that FIG. 3 shows 2 transfers per set for discussion purposes only; however, it will be understood that each set may include any number of DMA transfers that is less that the maximum value of the assigned semaphore. For example, if the SemA register is 16-bits, the first set may include up to 65,535 consecutive DMA transfers. Similarly, if the SemB register is 16-bits, the second set may include up to 65,535 consecutive DMA transfers.

The DMA engine 304 may increment the value of SemA after performing each DMA transfer from the first set of consecutive DMA transfers. For example, the TRIG1 operation 210a can trigger the DMA engine 304 to perform the DMA transfer1 306a using the DMA queue. After performing the transfer1 306a, the DMA engine 304 may increment the value of SemA to 1 to indicate completion of the transfer1 306a. Similarly, the TRIG2 operation 210b can trigger the DMA engine 304 to perform the DMA transfer2 306b using the same DMA queue. After performing the transfer2 306b, the DMA engine 304 may increment the value of SemA to 2 to indicate completion of the transfer2 306b.

The DMA engine 304 may increment the value of SemB after performing each DMA transfer from the second set of consecutive DMA transfers. For example, the TRIG3 operation 210c can trigger the DMA engine 304 to perform the DMA transfer3 306c using the DMA queue. After performing the transfer3 306c, the DMA engine 304 may increment the value of SemB to 1 to indicate completion of the transfer3 306c. Similarly, the TRIG4 operation 210d can trigger the DMA engine 304 to perform the DMA transfer4 306d using the same DMA queue. After performing the transfer4 306d, the DMA engine 304 may increment the value of SemB to 2 to indicate completion of the transfer4 306d. Note that certain embodiments have been discussed based on incrementing the semaphore values from the reset value of 0; however, it will be understood that other methods are possible for management of the semaphores within the scope of the disclosure. For example, in certain implementations, the semaphores can be reset to the maximum value and decremented after each DMA transfer. In certain other implementations, each semaphore can be reset to a different value.

The PE array 204 or the activation engine 206 may wait for the semaphore SemA or SemB to reach a respective threshold value to determine that a respective DMA transfer has completed before performing an operation. For example, as shown by an edge 308a in FIG. 3, the activation engine 206 may wait for the SemA value to be greater than or equal to 1 indicating completion of the transfer1 306a before performing the ACT1 operation 106a. Similarly, as shown by an edge 308b, the PE array 204 may wait for the SemA value to be greater than or equal to 2 indicating completion of the transfer2 306b before performing the MM2 operation 108a. Furthermore, as shown by an edge 308c, the activation engine 206 may wait for the SemB value to be greater than or equal to 1 indicating completion of the transfer3 306c before performing the ACT3 operation 106b. Similarly, as shown by an edge 308d, the PE array 204 may wait for the SemB value to be greater than or equal to 2 indicating completion of the transfer4 306d before performing the MM4 operation 108b. Although not shown in FIG. 3, in certain examples, the PE array 204 and the activation engine 206 may wait for a semaphore to reach the same threshold value for a given DMA transfer. For example, both the PE array 204 and the activation engine 206 may wait for the SemA value to be greater than or equal to 1 to perform the MM2 operation 108a and the ACT1 operation 106a, respectively.

Certain embodiments can allow the semaphores SemA and SemB to be reused again for subsequent sets of consecutive DMA transfers by resetting the semaphores SemA and the SemB after they are done being managed for the respective sets of DMA transfers assigned previously. The semaphore SemA can be reset after one or more computational engines are done waiting on the semaphore SemA for the first set of consecutive DMA transfers, and semaphore SemB can be reset after one or more computational engines are done waiting on the semaphore SemB for the second set of consecutive DMA transfers. The one or more computational engines can be done waiting on the semaphore SemA or SemB when all the operations that wait on the DMA transfers incrementing the semaphore SemA or SemB, respectively, are done. Resetting a semaphore before all the computational engines are done waiting on that semaphore to reach respective threshold values may deadlock the waiting computational engines or delay the execution of the operations to be performed by the computational engines, which can negatively impact the system performance.

For example, the pooling engine 302 may perform a SemAReset operation 318 to reset the SemA when all the operations that wait on the DMA transfers incrementing SemA are complete, e.g., the ACT1 operation 106a and the MM2 operation 108a. The SemAReset operation 318 may wait for the ACT1 operation 106a to complete as shown by an edge 310, and for the MM2 operation 108a to complete as shown by an edge 312. The ACT1 operation 106a can be performed after the SemA value reaches a threshold value of greater than or equal to 1, and the MM2 operation 108a can be performed after the SemA value reaches a threshold value of greater than or equal to 2. If SemA is reset before the ACT1 operation 106a or the MM2 operation 108a is performed, the activation engine 206 and the PE array 204 may continue waiting for SemA to reach the respective threshold value, which can deadlock the activation engine 206 and the PE array 204, or delay execution of the ACT1 operation 106a and the MM2 operation 108a. Note that the SemAReset operation 318 may need to wait only for a respective last operation performed by the activation engine 206 and the PE array 204 that may be dependent on a respective DMA transfer from the first set of consecutive DMA transfers. For example, the SemAReset operation 318 may not need to wait on other operations performed by the activation engine 206 prior to the ACT1 operation 106a, or by the PE array 204 prior to the MM2 operation 108a that may be dependent on the DMA transfers incrementing the SemA value.

Note that resetting the semaphore SemA by executing the SemAReset operation 318 after executing the second set of consecutive DMA transfers 306c-306d that increment the semaphore SemB can allow enough time for the first set of consecutive DMA transfers 306a-306b that increment the semaphore SemA to complete so that all the computational engines waiting on different values of SemA do not get blocked until the next time around. However, the SemAReset operation 318 can be executed any time after executing the TRIG2 operation 210b (or the last TRIG operation for the first set) as long as all the DMA transfers incrementing SemA are complete before resetting the semaphore SemA. Similarly, a SemBReset operation 320 can be executed any time after executing the TRIG4 operation 210d (or the last TRIG operation for the second set) to reset the semaphore SemB. The SemBReset operation 320 may wait for the ACT3 operation 106b to complete as shown by an edge 314, and for the MM4 operation 108b to complete as shown by an edge 316. The ACT3 operation 106b can be performed after the SemB value reaches a threshold value of greater than or equal to 1, and the MM4 operation 108b can be performed after the SemB value reaches a threshold value of greater than or equal to 2.

Execution of the SemAReset operation 318 can reset the semaphore SemA, which can allow reuse of the semaphore SemA for a third set of consecutive DMA transfers including a DMA transfer5 306e and a DMA transfer6 306f. The third set of consecutive DMA transfers may be subsequent to the second set of consecutive DMA transfers in the DMA queue. The DMA transfer5 306e and DMA transfer6 306f may be triggered by the pooling engine 302 by executing TRIG5 operation 210e and TRIG6 operation 210f, respectively, as discussed with reference to FIG. 2. The DMA engine 304 may increment the value of SemA after performing each DMA transfer from the third set of consecutive DMA transfers. After performing the transfer5 306e, the DMA engine 304 may increment the value of SemA to 1 (e.g., from the reset value of 0) to indicate completion of the transfer5 306e. After performing the transfer6 306f, the DMA engine 304 may increment the value of SemA to 2 to indicate completion of the transfer6 306f.

As shown by an edge 308e in FIG. 3, the activation engine 206 may wait for the SemA value to reach a threshold value of greater than or equal to 1 indicating completion of the transfer5 306e before performing the ACT5 operation 106c. Similarly, as shown by an edge 308f, the PE array 204 may wait for the SemA value to reach a threshold value of greater than or equal to 2 indicating completion of the transfer6 306f before performing the MM6 operation 108c. Although not shown here, the semaphore SemB can be re-used for a fourth set of consecutive DMA transfers that is subsequent to the third set of consecutive DMA transfers in the DMA queue. For example, the fourth set of consecutive DMA transfers can include DMA transfers that can be triggered by the pooling engine 302 by performing suitable TRIG operations. Note that the pooling engine 302 can perform additional operations including pooling operations, TRIG operations for subsequent sets of consecutive DMA transfers, and semaphore reset operations, which are not shown in FIG. 3 for ease of simplicity. Thus, alternating and resetting of the semaphores SemA and SemB across the sets of consecutive DMA transfers in the queue can allow DMA transfers for large neural networks with the semaphores having a limited range.

Note that even though FIG. 3 is described using 2 semaphores, more than 2 semaphores can be used by alternating the semaphores across the sets of consecutive DMA transfers in the queue in a round-robin or another predetermined order. For example, by alternating 3 semaphores across the sets in a round-robin manner, more time can be made available to complete each set of consecutive DMA transfers before resetting a semaphore assigned previously to a respective set. In certain examples, use of a third semaphore can enable delaying the execution of the SemAReset operation 318 and the SemBReset operation 320, which can allow more time for the first set of consecutive DMA transfers and the second set of consecutive DMA transfers to complete, respectively. For example, the third semaphore can be assigned to the third set of consecutive DMA transfers, and therefore the SemAReset operation 318 can be executed after performing the third set of consecutive DMA transfers, which can delay resetting of SemA. Similarly, the SemBReset operation 320 can be executed after performing the fourth set of DMA transfers, which can delay resetting of SemB.

Certain embodiments can support alternating more than 2 semaphores in a pre-determined pseudo-random order instead of the round-robin order. For example, a first semaphore can be assigned to a first set, a third set and a sixth set of consecutive DMA transfers, a second semaphore can be assigned to a second set and a seventh set of consecutive DMA transfers, a third semaphore can be assigned to a fourth set and a sixth set of consecutive DMA transfers, and so on. In certain embodiments, resetting and re-assignment of the semaphores for a DMA queue can be determined by the compiler based on the size of each DMA transfer to be processed by the DMA queue. However, assigning the semaphores to the DMA queue in a pseudo-random order may impact the system performance due to different delay amounts encountered by the computational engines from waiting on specific semaphore values before performing various operations.

Note that even though resetting of the semaphores SemA and SemB by the pooling engine 302 is discussed with reference to FIG. 3, it will be understood that the instruction SemAReset 318 or the SemBReset 320 can be executed by any engine in the apparatus 300 without deviating from the scope of the disclosure. For example, the instruction SemAReset 318 and/or the SemBReset 320 can be executed by the DMA engine 304, PE array 204, or the activation engine 206 within the scope of the disclosure.

Figure 4:
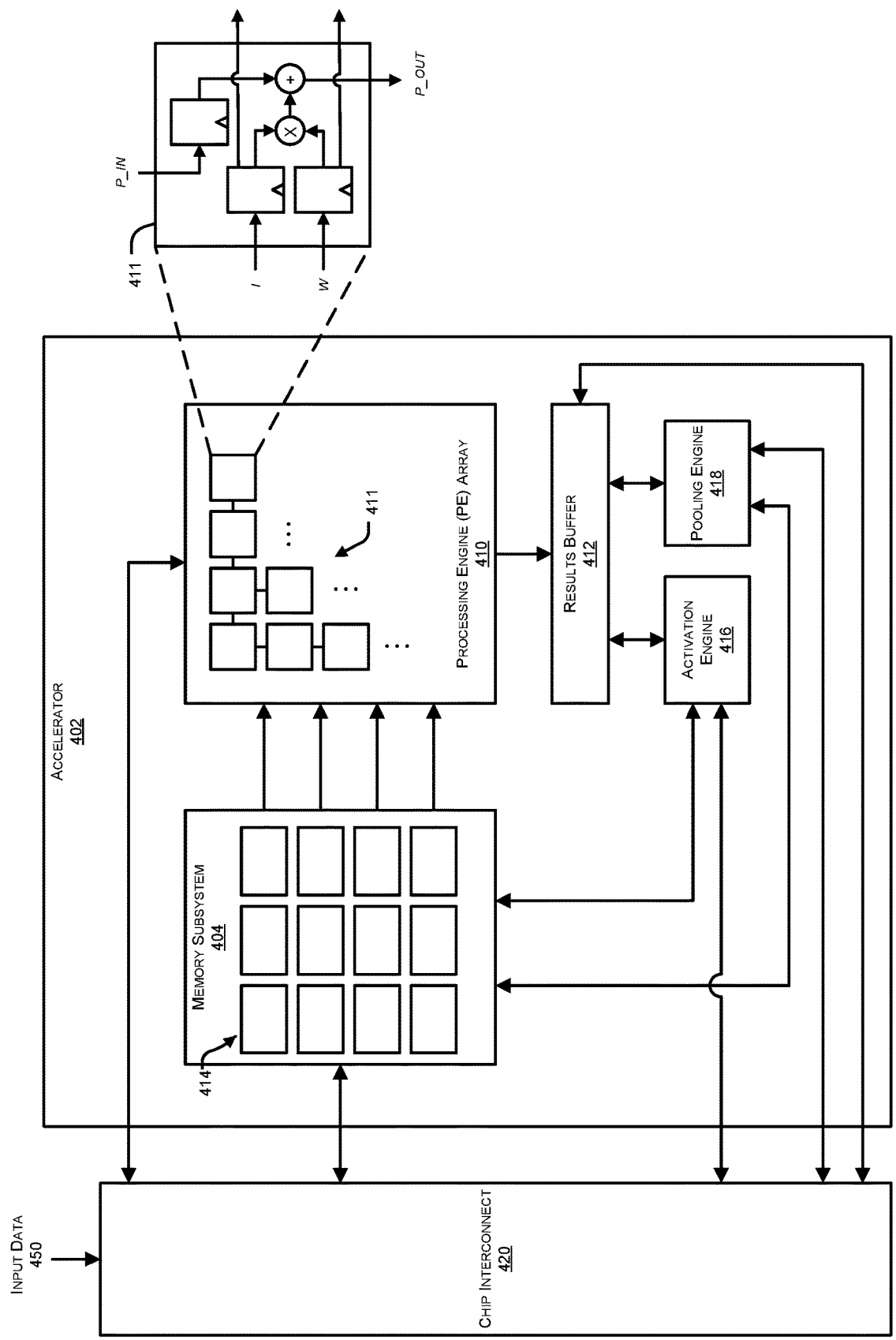
FIG. 4 is a block diagram illustrating an example of an integrated circuit device that can use two or more semaphores for synchronization of DMA transfers, according to certain embodiments.

FIG. 4 is a block diagram illustrating an example of an integrated circuit device that can use two or more semaphores for synchronization of DMA transfers, according to certain embodiments. The example of FIG. 4 illustrates an accelerator 402. In various examples, the accelerator 402, for a set of input data (e.g., input data 450), can perform computations using a processing engine (PE) array 410, an activation engine 416, and/or a pooling engine 418. Note that the accelerator 402 may include other components, which are not shown here for the purposes of simplicity. In some examples, the example accelerator 402 may be an integrated circuit component of a processor, such as a neural network processor. The processor may have other integrated circuit components, including additional accelerator engines. In certain examples, the PE array 410, activation engine 416 and the pooling engine 418 may be the PE array 204, activation engine 206 and the pooling engine 302, respectively, as described with reference to FIG. 3.

In various implementations, the memory subsystem 404 can include multiple memory banks 414. In these implementations, each memory bank 414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 404 can permit simultaneous access to the read or write channels of multiple memory banks. As another example, the memory subsystem 404 can include arbitration logic such that arbitration between, for example, the outputs of multiple memory banks 414 can result in more than one memory bank's output being used. In these and other examples, though globally managed by the memory subsystem 404, each memory bank can be operated independently of any other.

Having the memory banks 414 be independently accessible can increase the efficiency of the accelerator 402. For example, values can be simultaneously read and provided to each row of the PE array 410, so that the entire PE array 410 can be in use in one clock cycle. As another example, the memory banks 414 can be read at the same time when results computed by the PE array 410 are written to the memory subsystem 404. In contrast, a single memory may be able to service only one read or write at a time. With a single memory, multiple clock cycles can be required, for example, to read input data for each row of the PE array 410 before the PE array 410 can be started.

In various implementations, the memory subsystem 404 can be configured to simultaneously service multiple clients, including the PE array 410, the activation engine 416, the pooling engine 418, and any external clients that access the memory subsystem 404 over a chip interconnect 420. In some implementations, being able to service multiple clients can mean that the memory subsystem 404 has at least as many memory banks as there are clients. In some cases, each row of the PE array 410 can count as a separate client. In some cases, each column of the PE array 410 can output a result, such that each column can count as a separate write client. In some cases, output from the PE array 410 can be written into the memory banks 414 that can then subsequently provide input data for the PE array 410. As another example, the activation engine 416 and the pooling engine 418 can include multiple execution channels, each of which can be separate memory clients. The memory banks 414 can be implemented, for example, using static random-access memory (SRAM).

In various implementations, the memory subsystem 404 can include control logic. The control logic can, for example, keep track of the address spaces of each of the memory banks 414, identify memory banks 414 to read from or write to, and/or move data between the memory banks 414. In some implementations, memory banks 414 can be hardwired to particular clients. For example, a set of memory banks 414 can be hardwired to provide values to the rows of the PE array 410, with one memory bank servicing each row. As another example, a set of memory banks can be hard wired to receive values from columns of the PE array 410, with one memory bank receiving data for each column.

The PE array 410 is the computation matrix of the example accelerator 402. The PE array 410 can, for example, execute parallel integration, convolution, correlation, and/or matrix multiplication (MM), among other things. For example, the PE array 410 can execute instructions to perform different operations including MM2 108a, MM4 108b, and the MM6 108c operation. In certain embodiments, the PE array 410 may execute a wait instruction to wait on a semaphore register to reach a threshold value before performing an operation. The PE array 410 includes multiple processing engines 411, arranged in rows and columns, such that results output by one processing engine 411 can be input directly into another processing engine 411. Processing engines 411 that are not on the outside edges of the PE array 410 thus can receive data to operate on from other processing engines 411, rather than from the memory subsystem 404.

In various examples, the PE array 410 uses systolic execution, in which data arrives at each processing engine 411 from different directions at regular intervals. In some examples, input data can flow into the PE array 410 from the left and weight values can be loaded at the top. In some examples weights and input data can flow from the left and partial sums can flow from top to bottom. In these and other examples, a multiply-and-accumulate operation moves through the PE array 410 as a diagonal wave front, with data moving to the right and down across the array. Control signals can be input at the left at the same time as weights, and can flow across and down along with the computation.

In various implementations, the number of columns in the PE array 410 determines the computational capacity of the PE array 410, and the number of rows determines the required memory bandwidth for achieving maximum utilization of the PE array 410. The PE array 410 can have, for example, 64 columns and 128 rows, or some other number of columns and rows.

An example of a processing engine 411 is illustrated in FIG. 4 in an inset diagram. As illustrated by this example, a processing engine 411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 411.

In the illustrated example, an input from above can include a partial sum, p_in, provided either from another processing engine 411 or from a previous round of computation by the PE array 410. When starting a computation for a new set of input data, the top row of the PE array 410 can receive a fixed value for p_in, such as zero. As illustrated by this example, i and w are multiplied together and the result is summed with p_in to produce a new partial sum, p_out, which can be input into another processing engine 411. Various other implementations of the processing engine 411 are possible.

Outputs from the last row in the PE array 410 can be temporarily stored in the results buffer 412. The results can be intermediate results, which can be written to the memory banks 414 to be provided to the PE array 410 for additional computation. Alternatively, the results can be final results, which, once written to the memory banks 414 can be read from the memory subsystem 404 over the chip interconnect 420, to be output by the system. In some instances, new data from the input data 450 may need to be stored in the memory banks 414 but the memory banks 414 may have the intermediate results stored for additional computations by the PE array 410. In such cases, spilling of the memory banks 414 may occur which can cause a DMA transfer to move a portion of the data stored in the memory banks 414 to the host memory to free up space to store the new data. The data moved to the host memory can be reloaded into the memory banks 414, when needed by the PE array 410, using another DMA transfer. Thus, moving the data to and from the host memory due to spilling can increase the number of DMA transfers and the assigned semaphore value, which may be higher for large input data sets due to multiple instances of spilling. Certain embodiments can provide an optimized solution for the synchronization of large number of DMA transfers using two or more semaphores per queue without exceeding the range of a single semaphore.

In some implementations, the accelerator 402 includes an activation engine 416. In these implementations, the activation engine 416 can combine the results from the PE array 410 into one or more output activations. For example, for a convolutional neural network, convolutions from multiple channels can be summed to produce an output activation for a single channel. In other examples, accumulating results from one or more columns in the PE array 410 may be needed to produce an output activation for a single node in the neural network. In some examples, activation engine 416 can be bypassed.

In various examples, the activation engine 416 can include multiple separate execution channels. In these examples, the execution channels can correspond to the columns of the PE array 410, and can perform an operation on the outputs of a column, the result of which can be stored in the memory subsystem 404. In these examples, the activation engine 416 may be able to perform between 1 and n parallel computations, where n is equal to the number of columns in the PE array 410. In some cases, one or more of the computations can be performed simultaneously. Examples of computations that each execution channel can perform include exponentials, squares, square roots, identities, binary steps, bipolar steps, sigmoidals, and ramps, among other examples. In certain examples, the activation engine 416 may execute instructions to perform different operations (e.g., executing an activation function) including ACT1 106a, ACT 3 106b, or the ACT5 106c operation as discussed in FIG. 3. In certain embodiments, the activation engine 416 may execute a wait instruction to wait on a semaphore register to reach a threshold value before performing an operation.

In some implementations, the accelerator 402 can include a pooling engine 418 to perform pooling operations. For example, the pooling engine 418 can execute instructions to perform various operations including the pooling operations 102a-102f in FIG. 3. Pooling is the combining of outputs of the columns of the PE array 410. Combining can include for example, computing a maximum value, a minimum value, an average value, a median value, a summation, a multiplication, or another logical or mathematical combination. In various examples, the pooling engine 418 can include multiple execution channels that can operating on values from corresponding columns of the PE array 410. In these examples, the pooling engine 418 may be able to perform between 1 and n parallel computations, where n is equal to the number of columns in the PE array 410. In various examples, execution channels of the pooling engine 418 can operate in parallel and/or simultaneously. In some examples, the pooling engine 418 can be bypassed. Herein, the PE array 410, activation engine 416 and the pooling engine 418 may be referred to as computational engines.

In certain embodiments, the pooling engine 418 may execute the TRIG instructions 210a-210f to trigger DMA operations in addition to the pooling operations. For example, as discussed with reference to FIG. 3, the DMA operations may trigger sets of consecutive DMA transfers, like the DMA transfers 306a-306f on a DMA queue in the DMA engine 304. The pooling engine 418 may also execute instructions to reset the semaphores including the SemAReset 318 instruction or the SemBReset 320 instruction to reset the SemA register 608 or the SemB register 610 to allow reusing of the semaphore SemA or SemB, respectively, for large number of DMA transfers. In other embodiments, the instructions to reset SemA and SemB can be executed by other engines, e.g., the DMA engine 304, the PE array 410 or the activation engine 416, without deviating from the scope of the disclosure.

Input data 450 can arrive over the chip interconnect 420. The chip interconnect 420 can connect the accelerator 402 to other components of a processor, such as a DMA engine that can obtain input data 450 from an Input/Output (I/O) device, a storage drive, or a network interface. The input data 450 can be, for example one-dimensional data, such as a character string or numerical sequence, or two-dimensional data, such as an array of pixel values for an image or frequency and amplitude values over time for an audio signal. In some examples, the input data 450 can be three-dimensional, as may be the case with, for example, the situational information used by a self-driving car or virtual reality data. In some implementations, the memory subsystem 404 can include a separate buffer for the input data 450. In some implementations, the input data 450 can be stored in the memory banks 414 when the accelerator 402 receives the input data 450.

In some examples, the accelerator 402 can implement a neural network processing engine. In these examples, the accelerator 402, for a set of input data 450, can execute a neural network to perform a task for which the neural network was trained. Executing a neural network on a set of input data can be referred to as inference or performing inference.

The weights for the neural network can be stored in the memory subsystem 404, along with input data 450 on which the neural network will operate. The neural network can also include instructions, which can program the PE array 410 to perform various computations on the weights and the input data. The instructions can also be stored in the memory subsystem 404, in the memory banks 414 or in a separate instruction buffer. The PE array 410 can output intermediate results, which represent the outputs of individual layers of the neural network. In some cases, the activation engine 416 and/or pooling engine 418 may be enabled for computations called for by certain layers of the neural network. The accelerator 402 can store the intermediate results in the memory subsystem 404 for inputting into the PE array 410 to compute results for the next layer of the neural network. The PE array 410 can further output final results from a last layer of the neural network. The final results can be stored in the memory subsystem 404 and then be copied out to host processor memory or to another location.

Figure 5:
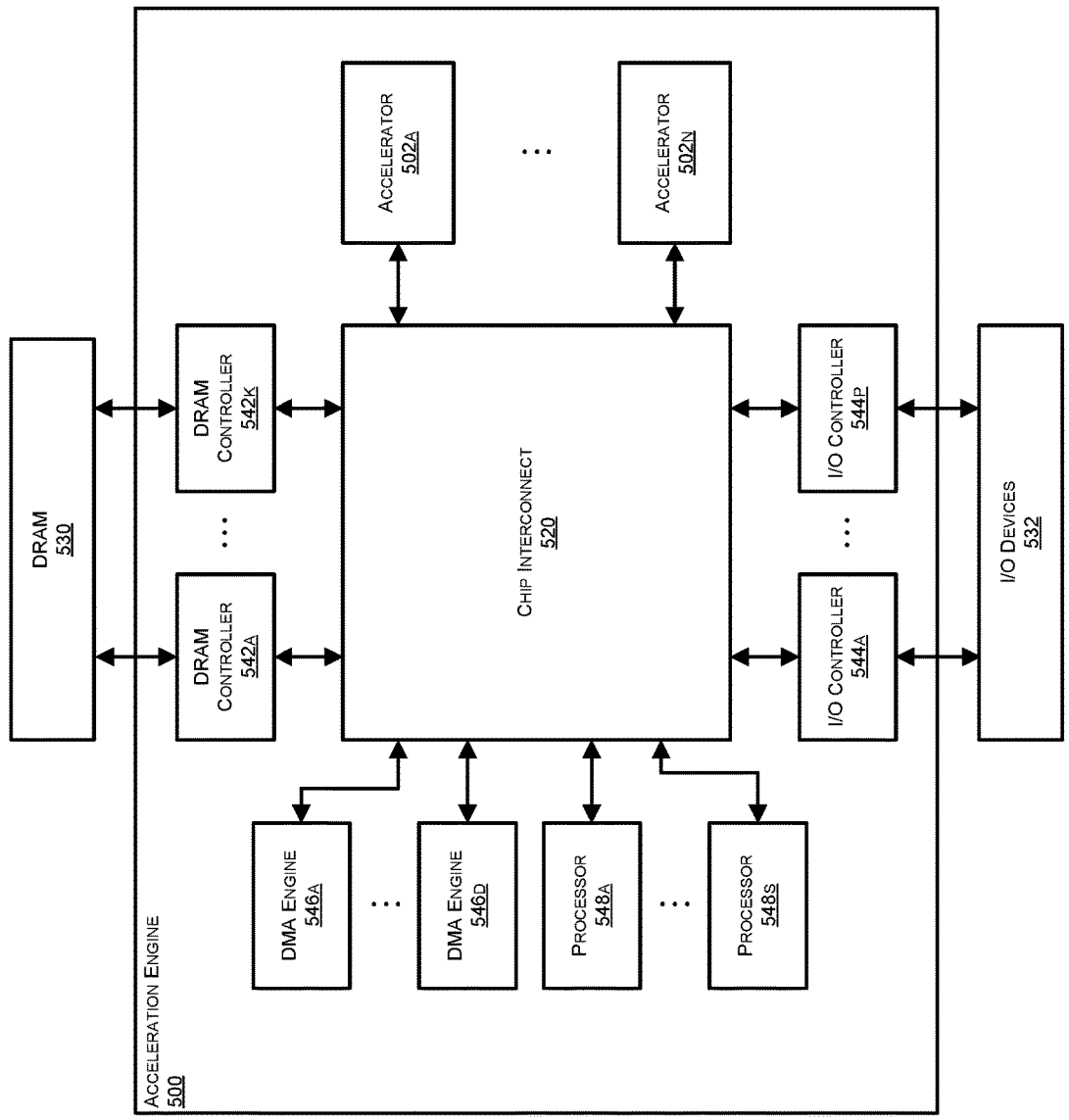
FIG. 5 includes a block diagram that illustrates an example of an acceleration engine.

FIG. 5 includes a block diagram that illustrates an example of an acceleration engine 500. The acceleration engine 500 is an example of an integrated circuit that can include one or more accelerators 502a-502n, like the accelerator 402 illustrated in FIG. 4.

In the example of FIG. 5, the acceleration engine 500 includes multiple accelerators 502a-502n, each of which can perform a set of operations. In various examples, the accelerators 502a-502n are for particular types of operations, so that the accelerators 502a-502n can perform the operations much faster than when similar operations are performed by a general-purpose processor. In various examples, to perform a set of operations, input data on which the operations are to be performed must first be moved into the accelerators 502a-502n. Additionally, in some cases, program code is also moved into the accelerators 502a-502n, which programs the operations that the accelerators 502a-502n will perform on the data. In the illustrated example, the acceleration engine 500 includes n accelerators 502a-502n. Examples of accelerators that can be included in the acceleration engine 500 include graphics accelerators, floating point accelerators, neural network accelerators, and others. In various examples, the accelerators 502a-502n can each be the same (e.g., each of the accelerators 502a-502n is a graphics accelerator) or can be different (e.g., the accelerators 502a-502n include a graphics accelerator, a floating-point accelerator, and neural network accelerator).

The example acceleration engine 500 further includes DRAM controllers 542a-542k for communicating with an external memory. The external memory is implemented, in this example, using DRAM 530. In the illustrated example, the acceleration engine 500 includes k DRAM controllers 542a-542k, each of which may be able to communicate with an independent set of banks of DRAM. In other examples, other types of RAM technology can be used for the external memory. The DRAM controllers 542a-542k can also be referred to as memory controllers.

In various examples, input data and/or program code for the accelerators 502a-502n can be stored in the DRAM 530. The program code may be generated by a compiler on a host system using a neural network model. Different programs can cause the accelerators 502a-502n to perform different operations. For example, when one of the accelerators is a neural network accelerator, one program can configure the neural network accelerator to perform speech recognition while another program can configure the neural network accelerator to perform image recognition. In various examples, different accelerators 502a-502n can be programmed with different programs, so that each performs a different set of operations. In various examples, the processors 548a-548s can manage moving of program code from the DRAM 530 to the accelerators 502a-502n.

The example acceleration engine 500 further includes I/O controllers 544a-544p for communicating with I/O devices 532 in the system. The acceleration engine 500 can communicate with I/O devices over, for example, a processor bus. In some examples, the processor bus can be implemented using Peripheral Component Interconnect (PCI) and/or a variation of the PCI bus protocol. The processor bus can connect the acceleration engine 500 to I/O devices such as, for example, input and output devices, memory controllers, storage devices, and/or network interface cards, among other things. In some examples, the I/O controllers 544-544p can enable the acceleration engine 500 to act as an I/O device for a host processor. For example, the acceleration engine 500 can be the recipient of input data from the host processor, and a command indicating an operation to be performed on the input data (e.g., a particular computation or analysis). In the illustrated example, the acceleration engine 500 includes p I/O controllers 544a-544p, each of which may include a separate root complex and may communicate with a separate set of I/O devices 532. In other examples, other standardized bus protocols, such as Ultra Path Interconnect (UPI) can be used for the host bus. In other examples, a proprietary bus protocol can be used.

Movement of data in the acceleration engine 500 can be managed by one or more processors 548a-548s, which can also be referred to as data management processors. In the example of FIG. 5, the acceleration engine 500 includes s processors 548a-548s incorporated into the device (e.g., on the same silicon die). In other examples, the processors 548a-548s can be external to the acceleration engine 500 (e.g., on a different die and/or in a different package). In some examples, the processors 548a-548s can manage the movement of data from I/O devices 532 to the accelerators 502a-502n or the DRAM 530. For example, input data may be located at an I/O device 532 or in processor memory, and the processors 548a-548s can move the input from the I/O device 532 or processor memory into an accelerator or into DRAM 530. As another example, program code for the accelerators 502a-502n may be located on an I/O device 532 or in processor memory.

The example acceleration engine 500 further includes DMA engines 546a-546d that can move data between the accelerators 502a-502n, DRAM controllers 542a-542k, and I/O controllers 544a-544p. In the illustrated example, the acceleration engine 500 includes d DMA engines 546a-546d. Each DMA engine 546a-546d may include certain functionality of the DMA engine 304 according to the embodiments. In some implementations, the DMA engines 546a-546d can be assigned to specific tasks, such as moving data from the DRAM controllers 542a-542d to the accelerators 502a-502n, or moving data between the I/O controllers 544a-544p and the accelerators 502a-502n. These tasks can be assigned, for example, by enqueueing descriptors with the DMA engines 546a-546d, where a descriptor identifies an address for a block of data and an operation (e.g., a read or a write) to perform. The descriptor may also provide information about the assigned semaphore for each DMA transfer. A descriptor, for example, can direct a DMA engine to instruct a DMA controller to read a block of data from DRAM 530. A descriptor can, as a further example, instruct the DMA engine to write data, read by the DMA controller, to an accelerator. Further descriptors can be used to move data from an accelerator to DRAM 530. For example, the descriptors can be part of the TRIG instructions 210a-210f to trigger DMA transfers 306a-306f. The DMA engines 546a-546d can perform subsequent sets of consecutive DMA transfers including the DMA transfers 306a-306f, and increment the value of the assigned semaphores (e.g., SemA or SemB), according to certain embodiments as discussed with reference to FIG. 3.

In various examples, each of the processors 548a-548s can be responsible for managing the data movement for a different accelerator. In some examples, a processor may manage the data movement for more than one accelerator. Similarly, in various examples, each of the processors 548a-548s can be assigned to one or more DMA engines 546a-546d. In these and other examples, associations between processors 548a-548s, accelerators 502a-502n, and DMA engines 546a-546d are determined by program code being executed by each respective processor.

In the example acceleration engine 500, the various components can communicate over a chip interconnect 520. The chip interconnect 520 primarily includes wiring for routing data between the components of the acceleration engine 500. In some cases, the chip interconnect 520 can include a minimal amount of logic, such as multiplexors to control the direction of data, flip-flops for handling clock domain crossings, and timing logic.

Figure 6:
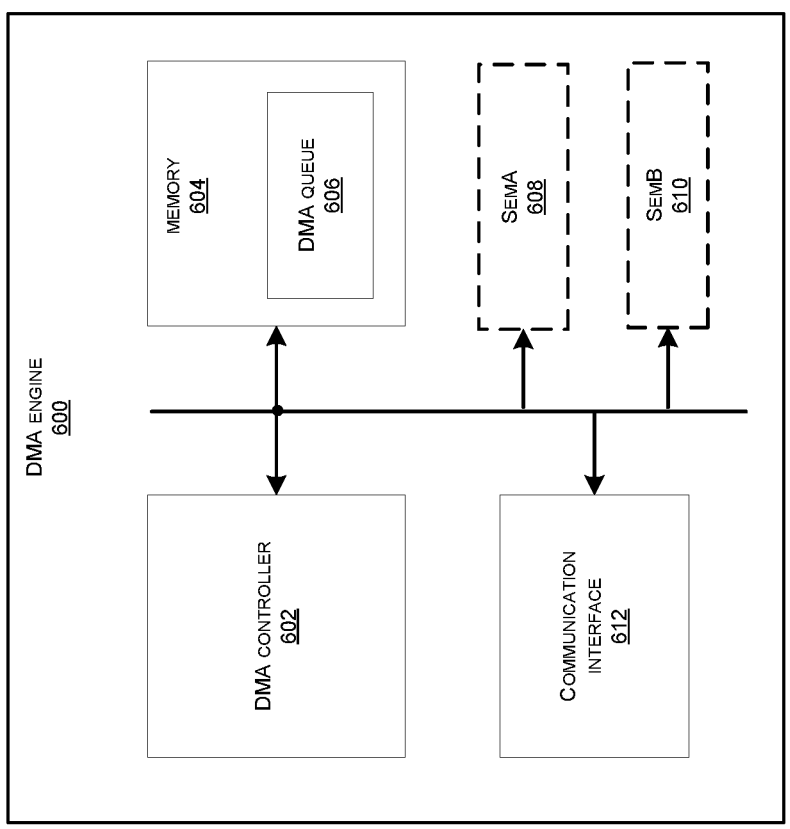
FIG. 6 includes a block diagram illustrating an example of a DMA engine, according to certain embodiments.

FIG. 6 includes a block diagram illustrating an example of a DMA engine 600 according to certain embodiments. The DMA engine 600 can be used for the DMA engine 304 or each of the DMA engines 546A-546D. The DMA engine 600 may include a DMA controller 602 coupled to a memory 604 comprising a DMA queue 606, and a communication interface 612 via a bus.

The memory 604 may include any suitable volatile memory, e.g., a DRAM, an SRAM, or an SDRAM. The DMA queue 606 may be implemented using any suitable data structure including a circular buffer, or a first-in-first-out (FIFO) buffer, among other. The DMA queue 606 or the memory 604 may be used to store data associated with DMA transfers including the data to be transferred from a source address to a destination address for a given DMA transfer. For example, the DMA queue 606 may be used to store data associated with the DMA transfer1 306a, transfer2 306b, transfer3 306c, transfer4 306d, transfer5 306e, or the transfer6 306f triggered by the pooling engine 302.

The DMA engine 600 can have access to all the semaphore registers including a SemA register 608 and a SemB register 610, which can be internal or external to the DMA engine 600. Each of the SemA register 608 and the SemB register 610 can be a hardware register of any suitable size, e.g., 8-bits, 16-bits, 24-bits, 32-bits, etc. The SemA register 608 and the SemB register 610 may be memory mapped in an address space of a host processor. The SemA register 608 and the SemB register 610 can be accessed by any component of the accelerator 402 via the chip interconnect 420. The SemA register 608 and the SemB register 610 can be read by the computational engines that wait on different values of the semaphores before performing an operation. The SemA register 608 or the SemB register 610 can be reset before exceeding its range to be re-used for the next set of DMA transfers. For example, as discussed with reference to FIG. 3, the pooling engine 302 may execute the SemAReset instruction 318 to reset the SemA register 608, or the SemBReset instruction 320 to reset the SemB register 610. The SemA register 608 and the SemB register 610 can be initialized at reset, prior to an inference or a training operation, or as needed.

The DMA controller 602 may be configured to perform the DMA transfers based on the DMA descriptors associated with each transfer. The DMA descriptors may be provided as part of the instruction to the DMA engine 600. In some implementations, the DMA descriptors may be stored in the DRAM 530 and a pointer to their location in the DRAM 530 may be provided in the instruction. The DMA controller 602 may include functionality to decode the instructions to perform the DMA transfers based on the descriptors. The DMA transfers, e.g., the transfers 306a-306f may be performed sequentially using the DMA queue 606. The DMA controller 602 may also include functionality to manage the SemA register 608 and the SemB register 610 including incrementing, decrementing, or resetting. For example, the SemA register 608 may be incremented after performing each of the transfer1 306a, transfer2 306b, transfer5 306e, and transfer6 306f. Similarly, the SemB register 610 may be incremented after performing the transfer3 306c and again after performing the transfer4 306d.

The communication interface 612 may be used to provide a suitable interface to communicate with other engines in the accelerator 402. For example, the DMA engine 600 may communicate with the pooling engine 302, the PE array 204, or the activation engine 206 as discussed with reference to FIG. 3. The communication interface 612 may also be used to interface with the host processor or the host memory for transfer of data, DMA descriptors, or completion status of the DMA transfers, among others.

Figure 7:
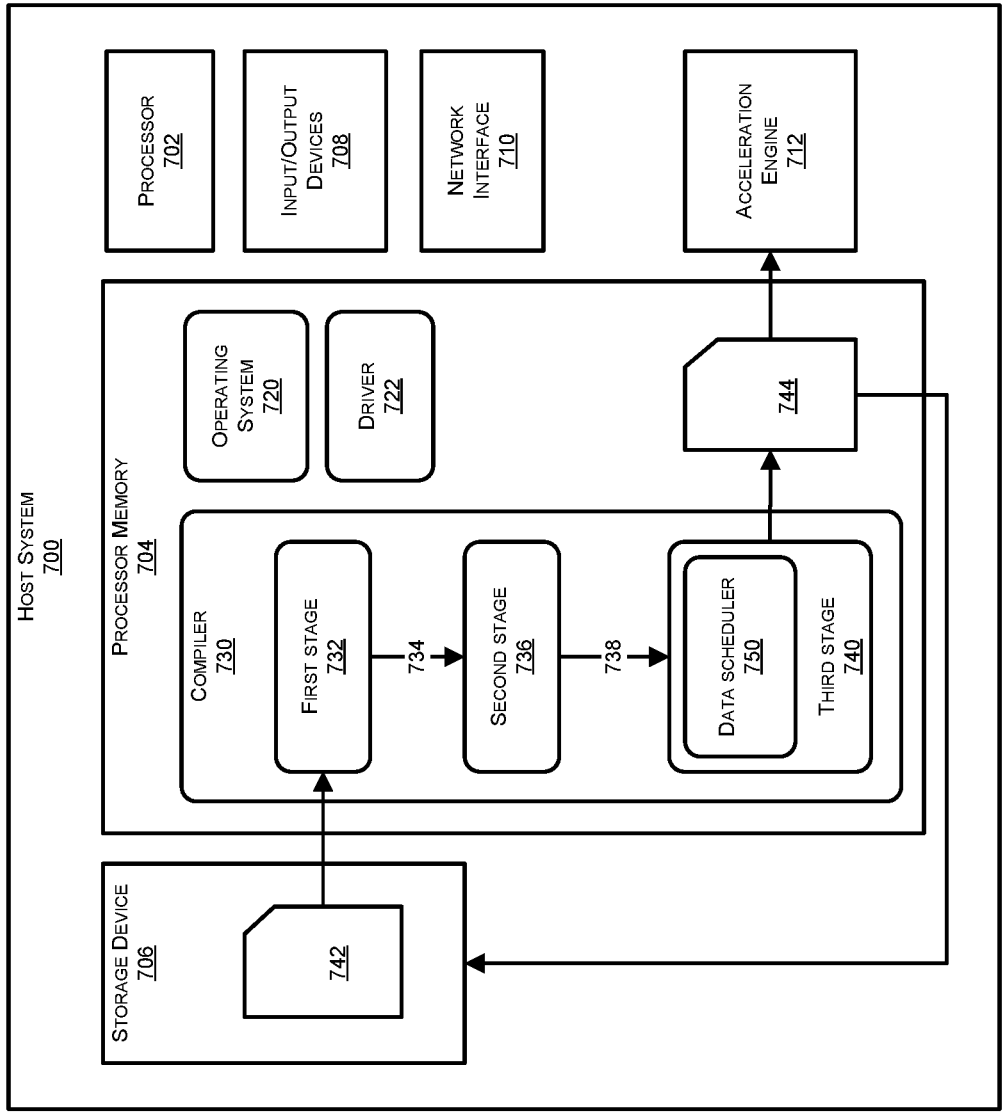
FIG. 7 includes a block diagram illustrating an example of a host system on which a compiler can run.

FIG. 7 includes a block diagram illustrating an example of a host system 700 on which a compiler 730, such as is described herein, can run. The illustrated host system 700 is an example of a computing device, and includes a processor 702, a processor memory 704, at least one storage device 706, various Input/Output (I/O) devices 708, and at least one network interface 710. In the example of FIG. 7, the host system 700 also includes an acceleration engine 712, which is an integrated circuit device that can accelerate certain operations or computations performed by the host system 700. In various examples, the host system 700 can be implemented as a server in a data center, a desktop computer, a laptop computer, a tablet computer, or a smartphone, among other examples. In some examples, operations or components discussed below as being performed or included in the host system 700 can be performed or included in other computer devices. For example, the compiler 730 can execute on the host system 700 while the acceleration engine 712 is located at a different host system. In certain examples, the acceleration engine 712 can be the acceleration engine 500 described with reference to FIG. 5.

The processor 702 is an integrated circuit device that can execute program code, in the form of instructions. The program code can be for various software applications or tools, such as an operating system 720 or the illustrated compiler 730. While the processor 702 is executing a program, the instructions for the program can be stored in the processor memory 704. The instructions can also be stored elsewhere, such as on the storage device 706, and can be loaded into the processor memory 704 when needed by the processor 702. The processor 702 can also use the processor memory 704 for temporary storage of other data on which the processor 702 is operating. In various examples, the processor memory 704 is a volatile memory type, such as a type of Random Access Memory, though non-volatile memory types can, alternatively or additionally, be used for the processor memory 704.

The storage device 706 is an example of a device that can include non-volatile memory. For example, the storage device 706 can be a magnetic disk drive, a solid state drive, or an optical drive, among other examples. The storage device 706 can further be non-transitory, such that program code and other data stored on the storage device 706 remains present when the storage device 706 is not powered on.

The storage device 706 is one example of a peripheral device, which are components that can be coupled to the host system 700 to add functionality to the host system 700. Other examples of peripheral devices include the Input/Output devices 708 and the network interface 710. The Input/Output devices 708 can include user input and output devices, such as keyboards, mice, touch screens, microphones, display screens, speakers, printers, and scanners, among other examples. The network interface 710, which can be implemented using a network interface card, can provide access to one or more networks. The network interface 710 can include, for example, a physical port for connecting a network cable and/or wireless antennas for communicating with Wi-Fi and/or cellular networks. The network interface 710 can also be described as an I/O device.

The acceleration engine 712 is also another type of peripheral device or I/O device. The acceleration engine 712 is a device that is purpose-built to perform certain operations that can be performed by the processor 702, but can be performed faster by the acceleration engine 712. For example, the acceleration engine 712 can be a neural network accelerator, and, as such, may be able to perform the large scale, parallel computations of a neural network more efficiently than when the computations are performed by the processor 702. As another example, the acceleration engine 712 can be a graphics processing unit (GPU), and may be optimized to perform the computations needed for graphics rendering. Other examples of devices that can be implemented by the acceleration engine 712 include cryptographic accelerators, compression and decompression accelerators, 3-D accelerators, regular expression accelerators, security accelerators, and others.

In various examples, the acceleration engine 712 can execute program code to perform certain operations. For example, when the acceleration engine 712 is a neural network accelerator, the acceleration engine 712 can be programmed to execute a particular neural network, such as one that performs image recognition or one that performs machine translation. As a further example, to support the execution of a neural network, the acceleration engine 712 can be programed to perform operations such as copying data for the neural network from the processor memory 704 (for example) into the acceleration engine 712, copying input data for the neural network from the processor memory 704 into the acceleration engine 712, and/or copying results from the acceleration engine 712 into the processor memory 704, among other examples. The acceleration engine 712 can use the DMA engines 546A-546D to copy or move the data according to certain embodiments.

To generate program code for the acceleration engine 712, in various examples, the host system 700 can execute the compiler 730. Compilers, in general, are software programs that translate program code written in a human-readable language into a format (e.g., machine instructions) that can be read and processed by an integrated circuit device. In the example of FIG. 7, the acceleration engine 712 is a neural network accelerator and the compiler 730 is for compiling a neural network description (or model) into instructions to be executed by the acceleration engine 712. When the acceleration engine 712 implements a different type of accelerator, another compiler can be used.

The compiler 730 can be activated, for example, when the operating system 720 receives keyboard, mouse, touchscreen, voice commands, or other inputs from the Input/Output devices 708. The inputs can further include parameters for the compiler 730, such as the input code 742 to compile and configuration options for the compilation process. Once the compiler 730 is activated, the processor 702 can load the instructions for the compiler 730 into the processor memory 704, and can execute the instructions.

In the example of FIG. 7, the compiler 730 includes a first stage 732, a second stage 736, and a third stage 740, which each perform different operations to produce compiled code 744. In other examples, the compiler 730 can combine the operations of the first stage 732, second stage 736, and/or third stage 740 into fewer stages, or can divide the operations of one of the stages into multiple stages.

The first stage 732 can receive and process input code 742. The input code 742 can describe a program in a high-level programming language, such as Java, C++, or Tensorflow, among many other examples. The input code 742 can describe, for example, steps to perform image recognition, speech recognition, machine translation, or other operations. The input code 742 can be obtained, for example, from the storage device 706. Alternatively, though not illustrated here, the input code 742 may be located in the processor memory 704 or can be obtained from a network location, using the network interface 710. Processing of the input code 742 can include sorting the operations described in the input code 742 into layers, where the outputs of one layer provide the inputs to a next layer. Processing can also include identifying steps to be performed by the processor 702, rather than by the acceleration engine 712. For example, the processor 702, through the execution of a driver 722, may need to perform steps such as configuring DMA descriptors for moving data into or out of the acceleration engine 712, among other examples. The processor 702 can also assign two or more semaphores for each DMA queue, like the SemA register 608 and the SemB register 610. The DMA descriptors may also include the address or location of the assigned semaphores. The assigned semaphores can be used alternatively in a round-robin order, or in another pre-determined order, for each set of consecutive DMA transfers in the DMA queue, where each set of consecutive DMA transfer includes number of DMA transfers that is smaller than the maximum value of the assigned semaphore.

The output 734 of the first stage 732 can be organized, for example, in the layers, nodes, and connections between nodes of a neural network. The second stage 736 can perform intermediate processing on this output 734. For example, the operations performed in any one layer, or at any one node in a layer, may be too many for the acceleration engine 712 to perform at the same time. The acceleration engine 712 may, for example, have a limited amount of locale storage space for the data needed for a computation, or the computations may be more than the acceleration engine 712 can perform at one time. In this example, the first stage 732 can break the operations of the layer or node down into smaller operations, which can fit into the acceleration engine's local memory and/or can fit into the computing capacity of the acceleration engine 712. Processing of the output 734 of the first stage 732 can include other steps, such as scheduling, or determining the order in which the acceleration engine 712 and/or processor 702 will perform operations, among other examples.

In various examples, the output 738 of the second stage 736 includes the various steps to be performed by components of the acceleration engine 712, in the order that the steps are to be performed. The output 738 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples. The data flow graph can be similar to the neural network graph 100 as described with reference to FIG. 1, which shows the nodes and the dependencies between the nodes, and can be represented using a neural network model.

The third stage 740 can operate on the output 738 of the second stage 736, and perform various steps before producing the instructions that are to be executed by the acceleration engine 712. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 740 can include a data scheduler 750 to determine the order in which instructions are executed by the acceleration engine 712. For example, the data scheduler 750 can insert various operations to be executed by the pooling engine 302, the DMA engine 304, the PE array 204, and the activation engine 206 to perform DMA synchronization using the assigned semaphores per DMA queue, according to certain embodiments. The data scheduler 750 may determine the size of each set of consecutive DMA transfers and assign a respective semaphore based on the range of the assigned semaphore. For example, the number of DMA transfers in each set has to be less than the maximum value of the assigned semaphore. As described with reference to FIG. 3, the data scheduler 750 may insert the instructions SemAReset 318 and SemBReset 320, as necessary, for execution by one of the computational engines to reset the semaphores SemA and SemB, respectively, based on the size of each set of the consecutive DMA transfers, and any other relevant factors.

The output of the third stage 740 is compiled code 744, which may include machine instructions in binary format. In some examples, the compiled code 744 can be stored in the processor memory 704. Alternatively, or additionally, the compiled code 744 can be copied to the storage device 706 or to a network location. As noted above, the acceleration engine 712 may be located at a different host system, in which case the compiled code 744 can be sent over the network interface 710 to the other host system. For example, the compiled code 744 can be stored in the DRAM 530 in FIG. 5 for execution by the acceleration engine 500.

In the example of FIG. 7, the host system 700 can be executing a driver 722, which can also be referred to as a device driver or runtime driver, that manages the acceleration engine 712. The driver 722 can provide an interface between applications executing on the host system 700 (or on another host system) and the acceleration engine 712. For example, the driver 722 can provide an Application Program Interface (API) that defines functions for feeding input data to the acceleration engine 712 and defining the operation to perform on the input data. In this and other examples, the driver 722 can configure the acceleration engine 712 to perform the operation. For example, the driver 722 can identify a neural network that the acceleration engine 712 is to execute, as well as the location in the processor memory 704 or on the storage device 106 where the compiled code 744 for the neural network is located. The driver 722 can further load into the acceleration engine 712 or cause the acceleration engine 712 to load the compiled code 744, can load or cause the acceleration engine 712 to load the input data on which the neural network is to operate, and/or can cause the acceleration engine 712 to being executing on the input data. Once the acceleration engine 712 has finished, the acceleration engine 712 can notify the driver 722, and the driver 122 can deliver a result back to the application that requested the result.

Figure 8:
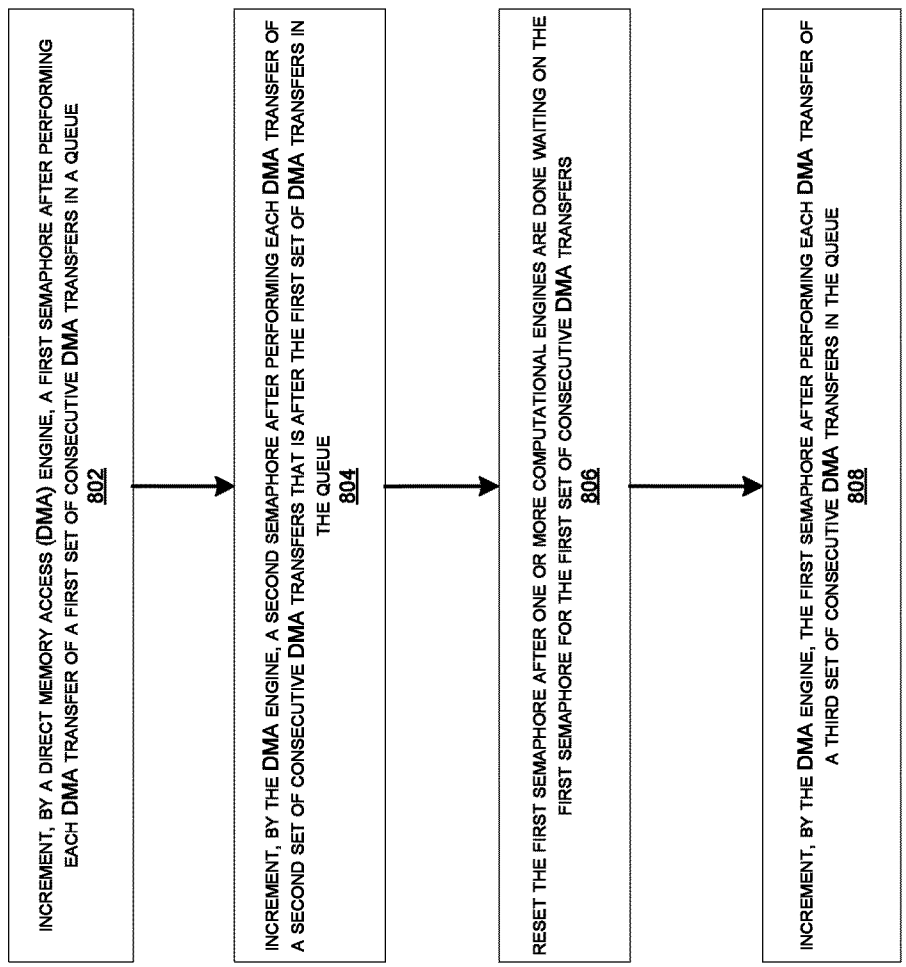
FIG. 8 includes a flowchart illustrating a method which can be used to perform synchronization of DMA transfers with two or more semaphores, according to certain embodiments.

FIG. 8 includes a flowchart 800 illustrating a method which can be used to perform synchronization of DMA transfers with two or more semaphores, according to certain embodiments. The method can be implemented by an accelerator for DMA synchronization; however, it is not limited to an accelerator and can be used for DMA synchronization in any computer system including multiple engines executing in parallel, without deviating from the scope of the disclosure. The method may be implemented by executing compiled code, which may be a portion of the compiled code 744 generated by the compiler 730, as discussed with reference to FIG. 7.

At step 802, a DMA engine may increment a first semaphore after performing each DMA transfer of a first set of consecutive DMA transfers in a queue. For example, the DMA engine can be any of the DMA engines 546A-546D in the acceleration engine 500, which can be used to perform DMA transfers for the accelerators 502A-502N, host processor, or the I/O devices 532. An example DMA engine is discussed with reference to FIG. 6. The DMA engine can perform the DMA synchronization as described with reference to the DMA engine 304 in FIG. 3. For example, the first set of consecutive DMA transfers may include the transfer1 306a and transfer2 306b in the queue. The transfer1 306a and transfer2 306b may be triggered by the pooling engine 302. The PE array 204 or the activation engine 206 may be dependent on completion of the transfer1 306a or the transfer2 306b to perform a respective operation. A first semaphore SemA and a second semaphore SemB may be assigned to the queue to be used alternatively for different sets of DMA transfers. For example, the semaphore registers SemA 608 and SemB 610 can be assigned to the DMA queue 606 as discussed with reference to FIG. 6. The semaphore registers SemA 608 and SemB 610 may be initialized to 0 before an inference or training operation, or before starting a first DMA transfer. As an example, the DMA engine 304 may increment the value of SemA register 608 to 1 after performing the transfer1 306*a* and to 2 after performing the transfer2 306*b*.

At step 804, the DMA engine may increment a second semaphore after performing each DMA transfer of a second set of consecutive DMA transfers that is after the second set of consecutive DMA transfers in the queue. The second set of consecutive DMA transfers may include the transfer3 306*c* and the transfer4 306*d* in the queue that may be triggered by the pooling engine 302. The DMA engine may increment the value of SemB register 610 to 1 after performing the transfer3 306*c* and to 2 after performing the transfer4 306*d*.

At step 806, the first semaphore can be reset after one or more computational engines are done waiting on the first semaphore for the first set of consecutive DMA transfers. The one or more computational engines may include a first computational engine and a second computational engine. The first computational engine may be done waiting on the first semaphore when it perform a first operation upon the first semaphore reaching a first threshold value for the first set of consecutive DMA transfers, and the second computational engine maybe done waiting on the first semaphore when the second computational engine performs a second operation upon the first semaphore reaching a second threshold value for the first set of consecutive DMA transfers.

As an example, the first computational engine may be the activation engine 206 and the second computational engine may be the PE array 204. As discussed with reference to FIG. 3, the activation engine 206 may be done waiting on SemA when the activation engine 206 performs the ACT1 operation 106*a* upon SemA reaching the first threshold value of greater than or equal to 1, as shown by the edge 308*a*. SemA reaching the value greater than or equal to 1 may indicate completion of the DMA transfer1 306*a*. Similarly, the PE array 204 may be done waiting on SemA when the PE array 204 performs the MM2 operation 108*a* upon SemA reaching the second threshold value of greater than or equal to 2, as shown by the edge 308*b*. SemA reaching the value greater than or equal to 2 may indicate completion of the DMA transfer2 306*b*. SemA can be reset by executing the SemAReset instruction 318 by the pooling engine 302 after the activation engine 206 and the PE array 204 are done waiting on SemA for the first set of consecutive DMA transfers, as shown by the edges 310 and 312. Note that the SemAReset instruction 318 can be executed any time after executing the TRIG2 operation 210*b* as long as none of the other engines are waiting on a specific value of SemA for the first set to perform an operation.

At step 808, the DMA engine may increment the first semaphore after performing each DMA transfer of a third set of consecutive DMA transfers in the queue. In one example, the third set of consecutive DMA transfers may be after the second set of consecutive DMA transfers in the queue. For example, the third set of consecutive DMA transfers may include the DMA transfer5 306*e* and the transfer6 306*f* triggered by the pooling engine 302 after executing the SemAReset instruction 318 to reset SemA. Thus, SemA may be reset to 0, and therefore the DMA engine may increment the value of SemA register 608 to 1 after performing the transfer5 306*e* and to 2 after performing the transfer6 306*f*. In another example, the third set of consecutive DMA transfers may be after a fourth set of consecutive DMA transfers in the queue. For example, the fourth set of consecutive DMA transfers may be assigned to a third semaphore and may be after the second set of consecutive DMA transfers in the queue. The DMA engine 304 may increment the third semaphore after performing each DMA transfer of the fourth set of consecutive DMA transfers, and increment the first semaphore after performing each DMA transfer of the third set of consecutive DMA transfers that is after the fourth set of consecutive DMA transfers in the queue. In this example, the first semaphore, second semaphore, and the third semaphore may be alternated in a round-robin order or another pre-determined order.

Similarly, the second semaphore can be reset after the one or more computational engines are done waiting on the second semaphore. After the second semaphore is reset, the DMA engine can increment the second semaphore after performing each DMA transfer of a subsequent set of consecutive DMA transfers in the queue. For example, the activation engine 206 may be done waiting on SemB when the activation engine 206 performs the ACT3 operation 106*b* upon SemB reaching a third threshold value of greater than or equal to 1, as shown by the edge 308*c*. SemB reaching the value greater than or equal to 1 may indicate completion of the transfer3 306*c*. Similarly, the PE array 204 may be done waiting on SemB when the PE array 204 performs the MM4 operation 108*b* upon SemB reaching a fourth threshold value of greater than or equal to 2, as shown by the edge 308*d*. SemB reaching the value greater than or equal to 2 may indicate completion of the transfer4 306*d*. SemB can be reset by executing the SemBReset instruction 320 by the pooling engine 302 after the activation engine 206 and the PE array 204 are done waiting on SemB as shown by the edges 314 and 316. Note that the SemBReset instruction 320 can be executed any time after executing the TRIG4 operation 210*d* as long as none of the other engines are waiting on a specific value of SemB for the second set to perform an operation.

Figure 9:
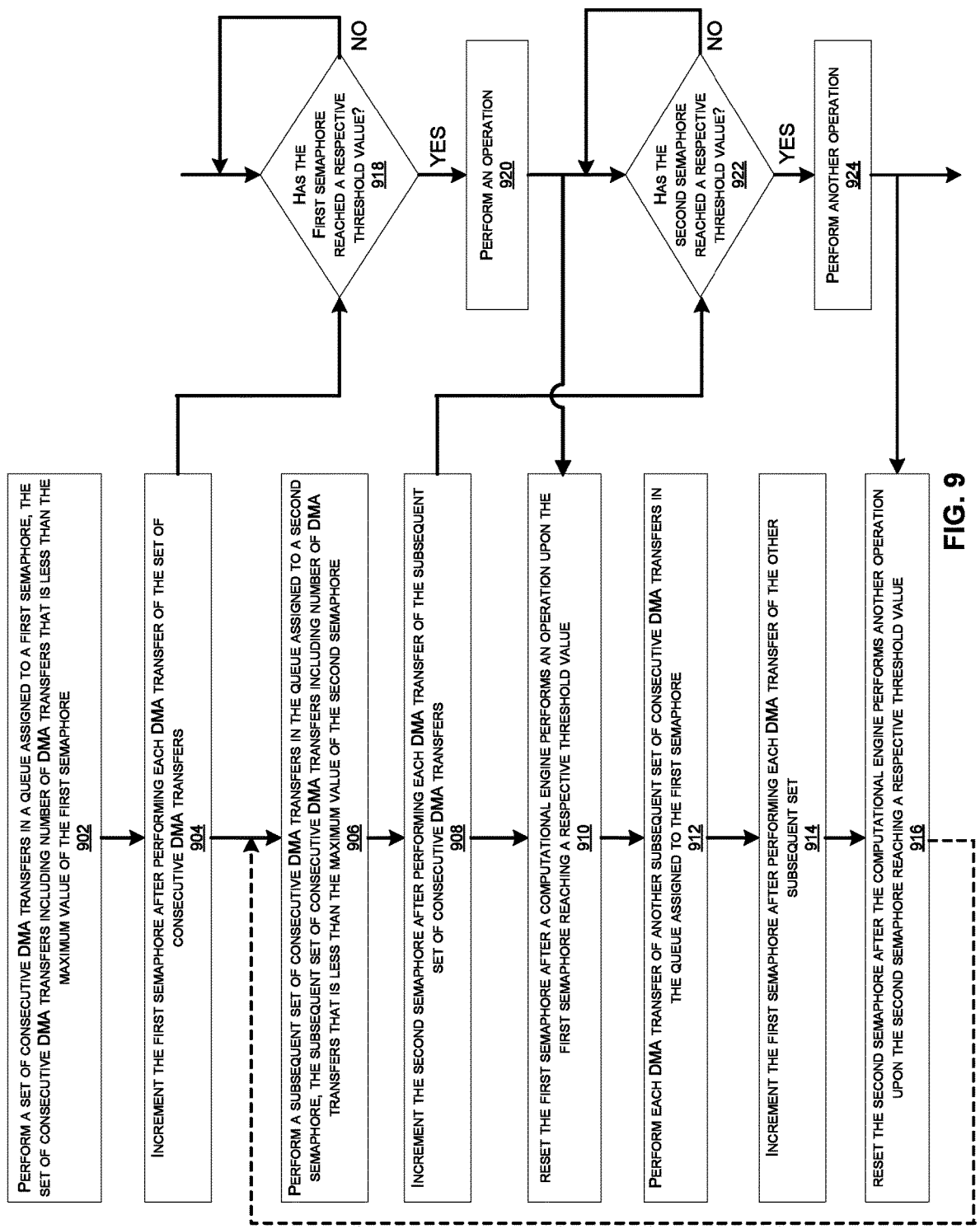
FIG. 9 includes a flowchart illustrating a method which can be used to generate instructions to perform synchronization of sets of DMA transfers with alternating semaphores, according to certain embodiments.

FIG. 9 includes a flowchart 900 illustrating a method, which can be used to generate instructions to perform synchronization of sets of consecutive DMA transfers with alternating semaphores, according to certain embodiments. In certain examples, the instructions illustrated by the flowchart 900 can be generated by executing the compiler 730 based on a neural network model, as discussed with reference to FIG. 7. The instructions can be executed by different components of the accelerator 500 or another suitable system to perform DMA synchronization without deviating from the scope of the disclosure. For example, the instructions can be executed by the pooling engine 302, DMA engine 304, PE array 204, or the activation engine 206 in FIG. 3. In certain examples, the pooling engine 302 can trigger multiple sets of DMA transfers on the DMA engine 304 sequentially. As discussed with reference to FIG. 3, the multiple sets of consecutive DMA transfers may include a first set comprising the DMA transfers 306*a*-306*b*, a second set comprising the DMA transfers 306*c*-306*d*, and a third set comprising the DMA transfers 306*e*-306*f*.

At step 902, the method may include generating the instructions to perform a set of consecutive DMA transfers in a queue assigned to a first semaphore. The set of consecutive DMA transfers may include number of DMA transfers that is less than the maximum value of the first semaphore. As an example, the set of consecutive DMA transfers can be a first set of consecutive DMA transfers including the transfers 306*a*-306*b* in FIG. 3. In certain embodiments, the DMA engine 304 may execute the instructions to perform each DMA transfer of the first set of consecutive DMA transfers. The first set of consecutive DMA transfers may be triggered by the pooling engine 302. In certain examples, the first semaphore can be the SemA register 608, and the number of DMA transfers in the first set can be less than the maximum value of the SemA register 608. For example, if the SemA register 608 is a 16-bit register, the number of DMA transfers in the first set may be less than 65,535.

At step 904, the method may include generating additional instructions to increment the first semaphore after performing each DMA transfer of the set of consecutive DMA transfers. The DMA engine 304 may execute the instructions to increment the value of SemA register 608 after performing each DMA transfer of the first set. The SemA register 608 may have been initialized to a value of 0. The SemA register 608 can be incremented to a value 1 after performing the transfer1 306a and to a value 2 after performing the transfer2 306b.

At step 918, the method may include generating additional instructions to determine if the first semaphore has reached a respective threshold value. For example, a computational engine may execute a wait instruction to determine if the first semaphore has reached the respective threshold value. The computational engine may include the activation engine 206, which may wait for SemA to reach a threshold value of greater than or equal to 1 for the first set of consecutive DMA transfers, or the PE array 204, which may wait for SemA to reach a threshold value of greater than or equal to 2 for the first set of consecutive DMA transfers. Note that the wait instruction generated in the step 918 can be executed by multiple computational engines in parallel while the DMA engine is performing the DMA transfers and incrementing the respective value of the first semaphore.

At step 920, the method may include generating additional instructions to perform an operation when the first semaphore reaches the respective threshold value. Referring back to FIG. 3, the activation engine 206 may execute instructions to perform the ACT1 operation 106a when the SemA reaches the threshold value of greater than or equal to 1, or the PE array 204 may execute instructions to perform the MM2 operation 108a when SemA reaches the threshold value of greater than or equal to 2. Note that the instructions generated in the step 920 can be executed by multiple computational engines in parallel to perform the respective operations.

At step 906, the method may include generating additional instructions to perform a subsequent set of consecutive DMA transfers in the queue assigned to a second semaphore. The subsequent set of consecutive DMA transfers may be a second set that is after the first set of consecutive DMA transfers in the queue, and may include number of DMA transfers that is less than the maximum value of the second semaphore. In certain embodiments, the DMA engine 304 may execute the instructions to perform each DMA transfer of a second set of consecutive DMA transfers in the queue. The second set of consecutive DMA transfers may be triggered by the pooling engine 302. For example, the second set of consecutive DMA transfers may include the transfers 306c-306d. In certain examples, the second semaphore can be the SemB register 610, and the number of DMA transfers in the second set can be less than the maximum value of the SemB register 610. For example, if the SemB register 610 is a 16-bit register, the number of DMA transfers in the second set may be less than 65,535. Note that the number of DMA transfers in each set may or may not be equal.

At step 908, the method may include generating additional instructions to increment the second semaphore after performing each DMA transfers of the subsequent set of consecutive DMA transfers. The DMA engine 304 may execute the instructions to increment the value of SemB register 610 after performing each DMA transfer of the subsequent set. The SemB register 610 may have been initialized to a value of 0. The SemB register 610 can be incremented to a value 1 after performing the transfer3 306c and to a value 2 after performing the transfer4 306d.

At step 922, the method may include generating additional instructions to determine if the second semaphore has reached a respective threshold value. For example, a computational engine may execute a wait instruction to determine if the second semaphore has reached the respective threshold value. The computational engine may include the activation engine 206, which may wait for SemB to reach a threshold value of greater than or equal to 1 for the second set of consecutive DMA transfers, or the PE array 204, which may wait for SemB to reach a threshold value of greater than or equal to 2 for the second set of consecutive DMA transfers. Note that the wait instruction generated in the step 922 can be executed by multiple computational engines in parallel while the DMA engine is performing the DMA transfers and incrementing the respective value of the second semaphore.

At step 924, the method may include generating additional instructions to perform another operation when the second semaphore reaches the respective threshold value. Referring back to FIG. 3, the activation engine 206 may execute instructions to perform the ACT3 operation 106b when the SemB reaches the threshold value of greater than or equal to 1, or the PE array 204 may execute instructions to perform the MM4 operation 108b when SemB reaches the threshold value of greater than or equal to 2. Note that the instructions generated in the step 924 can be executed by multiple computational engines in parallel to perform the respective operations.

At step 910, the method may include generating additional instructions to reset the first semaphore after a computational engine performs an operation upon the first semaphore reaching a respective threshold value as shown in step 920. For example, the computational engine may include the PE array 204 or the activation engine 206. The pooling engine 302 may execute the SemAReset instruction 318 to reset the SemA register 608 after the PE array 204 performs the MM2 operation 108a upon the SemA register 608 reaching a first threshold value of equal to or greater than 2. In certain embodiments, the instructions to reset the first semaphore may also be dependent on the activation engine 206 performing the ACT1 operation 106a upon the SemA register 608 reaching a second threshold value of equal to or greater than 1. Note that resetting the first semaphore after performing the subsequent set of consecutive DMA transfers allows enough time for the first set of consecutive DMA transfers incrementing the first semaphore to finish; however, the first semaphore can be reset any time after step 904 as long as all the DMA transfers of the first set that can increment the first semaphore are complete.

At step 912, the method may include generating additional instructions to perform each DMA transfer of another subsequent set of consecutive DMA transfers in the queue assigned to the first semaphore. In certain embodiments, the DMA engine 304 may execute the instructions to perform each DMA transfer of a third set of consecutive DMA transfers, which is after the second set in the queue, assigned to SemA. For example, the instructions can be generated for the DMA engine 304 to perform the DMA transfers 306e-306f in the queue assigned to SemA. The third set of consecutive DMA transfers may be triggered by the pooling engine 302. For example, the third set of consecutive DMA transfers may include the transfers 306e-306f.

At step 914, the method may include generating additional instructions to increment the first semaphore after performing each DMA transfer of the other subsequent set. The DMA engine 304 may execute the instructions to increment the value of SemA register 608 after performing each DMA transfer of the other subsequent set. The SemA register 608 may have been reset to a value of 0 in step 910 from executing the SemAReset instruction 318. The SemA register 608 can be incremented to a value 1 after performing the transfer5 306e and to a value 2 after performing the transfer6 306f.

At step 916, the method may include generating additional instructions to reset the second semaphore after the computational engine performs another operation upon the second semaphore reaching a respective threshold value as shown in step 924. For example, the pooling engine 302 may execute the SemBReset instruction 320 to reset the SemB register 610 after the PE array 204 performs the MM4 operation 108b upon the SemB register 610 reaching a third threshold value of equal to or greater than 2. In certain embodiments, the instructions to reset the second semaphore may also be dependent on the activation engine 206 performing the ACT3 operation 106b upon the SemB register 610 reaching a fourth threshold value of equal to or greater than 1. Note that resetting the second semaphore after performing the third set of consecutive DMA transfers allows enough time for the second set of consecutive DMA transfers incrementing the second semaphore to finish; however, the second semaphore can be reset any time after step 908 as long as all the DMA transfers of the second set that can increment the second semaphore are complete. After the second semaphore is reset, another subsequent set of consecutive DMA transfers in the queue assigned to the second semaphore can be performed by the DMA engine 304. For example, the steps 906-916 can be repeated to generate additional instructions for subsequent sets of DMA transfers in the queue by alternating between the first semaphore and the second semaphore across the sets.

In certain examples, the method may include generating additional instructions to perform an additional set of consecutive DMA transfers assigned to a third semaphore, which can be triggered by the pooling engine 302 after triggering the second set of consecutive DMA transfers. The method may also include generating additional instructions to increment the third semaphore after each DMA transfer of the additional set of consecutive DMA transfers. For example, the DMA engine 304 may perform the additional set of consecutive DMA transfers and increment the third semaphore after each DMA transfer after completing the second set of consecutive DMA transfers, as described with reference to steps 906 and 908. Performing additional sets of consecutive DMA transfers after the set can allow more time for the first set of consecutive DMA transfers to complete before resetting the first semaphore.

Thus, according to certain embodiments, two or more semaphores can be alternated across sequential sets of consecutive DMA transfers in the same queue to optimize the DMA synchronization without exceeding the range of each semaphore. Note that the above method has been described mostly using two semaphores, but it will be understood that more than two semaphores can be used in any suitable manner (e.g., round robin) to perform DMA synchronization for sequential sets of consecutive DMA transfers in the same queue, where each set of consecutive DMA transfers includes number of DMA transfers that is less than the maximum value of the given semaphore. The total number of DMA transfers that can be performed for an inference or training operation can be more than the sum of the maximum value of all the semaphores. Alternating and resetting of the semaphores for each DMA queue can provide an optimized solution for DMA synchronization independently of the size of the neural network.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules. Any of the methods described herein can be implemented as a computer-readable medium or a computer program product comprising instructions which, when the program is executed by one or more computers, cause the one or more computers to carry out the steps of the method. Such computer program products can be transmitted, over a wired or wireless network, in a data carrier signal carrying the computer program product.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for synchronization of direct memory access (DMA) transfers for a neural network, comprising:
    receiving a neural network model for the neural network; and
    generating, based on the neural network model, instructions for:
        triggering, by a first computational engine, a first set of consecutive DMA transfers in a DMA queue, wherein a first semaphore is assigned to the first set of consecutive DMA transfers, and wherein the first set of consecutive DMA transfers includes a number of DMA transfers that is less than a maximum value of the first semaphore;
        performing, by a DMA engine, the first set of consecutive DMA transfers using the DMA queue, wherein the first set of consecutive DMA transfers provides data to be consumed during operations by one or more computational engines, the one or more computational engines comprising a second computational engine;
        incrementing, by the DMA engine, the first semaphore after performing each DMA transfer of the first set of consecutive DMA transfers in the DMA queue;
        triggering, by the first computational engine, a second set of consecutive DMA transfers in the DMA queue, wherein a second semaphore is assigned to the second set of consecutive DMA transfers, and wherein the second set of consecutive DMA transfers includes a number of DMA transfers that is less than a maximum value of the second semaphore;
        performing, by the DMA engine, the second set of consecutive DMA transfers using the DMA queue after the first set of consecutive DMA transfers has been performed;
        incrementing, by the DMA engine, the second semaphore after performing each DMA transfer of the second set of consecutive DMA transfers;
        performing, by the second computational engine, a first operation after the first semaphore reaches a first threshold value for the first set of consecutive DMA transfers, wherein the first threshold value is greater than a reset value of the first semaphore but less than the maximum value of the first semaphore;
        determining, by the first computational engine based on completion of the second set of consecutive DMA transfers, that all operations consuming the data provided by the first set of consecutive DMA transfers have been performed, wherein the completion of the second set of consecutive DMA transfers indicates that enough time has passed for all operations consuming the data provided by the first set of consecutive DMA transfers, including at least the first operation, to be performed;
        resetting, by the first computational engine, the first semaphore to the reset value of the first semaphore in response to determining that all operations consuming the data provided by the first set of consecutive DMA transfers have been performed, wherein resetting the first semaphore allows the first semaphore to be reused for a third set of consecutive DMA transfers in the DMA queue;
        triggering, by the first computational engine, the third set of consecutive DMA transfers in the DMA queue;
        performing, by the DMA engine, the third set of consecutive DMA transfers using the DMA queue after the second set of consecutive DMA transfers has been performed; and
        switching from the second semaphore back to using the first semaphore for the third set of consecutive DMA transfers, wherein switching back to using the first semaphore comprises:
            reassigning the first semaphore to the third set of consecutive DMA transfers, and
            incrementing, by the DMA engine, the first semaphore after performing each DMA transfer of the third set of consecutive DMA transfers.

2. The computer-implemented method of claim 1, further comprising generating, based on the neural network model, additional instructions for:
    performing, by a third computational engine, a second operation after the first semaphore reaches a second threshold value for the first set of consecutive DMA transfers,
    wherein the second threshold value is greater than the first threshold value but less than the maximum value of the first semaphore, and
    wherein determining that all operations consuming the data provided by the first set of consecutive DMA transfers have been performed is further based upon the third computational engine performing the second operation.

3. The computer-implemented method of claim 1, further comprising generating, based on the neural network model, additional instructions for:
    performing, by the second computational engine, a second operation after the second semaphore reaches a second threshold value for the second set of consecutive DMA transfers, wherein the second threshold value is greater than a reset value of the second semaphore but less than the maximum value of the second semaphore;
    performing, by a third computational engine, a third operation after the second semaphore reaches a third threshold value for the second set of consecutive DMA transfers, wherein the third threshold value is greater than the second threshold value but less than the maximum value of the second semaphore; and resetting, by the first computational engine, the second semaphore based upon the second computational engine performing the second operation and the third computational engine performing the third operation.

4. The computer-implemented method of claim 1, wherein the second computational engine performs the first operation using a portion of data associated with the first set of consecutive DMA transfers.

5. A computer-implemented method comprising:

incrementing, by a direct memory access (DMA) engine, a first semaphore for a DMA queue after performing each DMA transfer of a first set of consecutive DMA transfers in the DMA queue, wherein the first set of consecutive DMA transfers provides data to be consumed during operations by one or more computational engines;

incrementing, by the DMA engine, a second semaphore for the DMA queue after performing each DMA transfer of a second set of consecutive DMA transfers that is after the first set of consecutive DMA transfers in the DMA queue;

determining that all operations consuming the data provided by the first set of consecutive DMA transfers have been performed;

resetting the first semaphore in response to determining that all operations consuming the data provided by the first set of consecutive DMA transfers have been performed, wherein resetting the first semaphore allows the first semaphore to be reused for a third set of consecutive DMA transfers in the DMA queue; and switching from the second semaphore back to using the first semaphore for the third set of consecutive DMA transfers, wherein switching back to using the first semaphore comprises incrementing, by the DMA engine, the first semaphore after performing each DMA transfer of the third set of consecutive DMA transfers.

6. The computer-implemented method of claim 5, wherein:

the one or more computational engines include a first computational engine and a second computational engine, the first computational engine performs a first operation upon the first semaphore reaching a first threshold value for the first set of consecutive DMA transfers, the first threshold value is greater than a reset value of the first semaphore but less than a maximum value of the first semaphore, the second computational engine performs a second operation upon the first semaphore reaching a second threshold value for the first set of consecutive DMA transfers, and the second threshold value is greater than the first threshold value but less than the maximum value of the first semaphore.

7. The computer-implemented method of claim 6, wherein the first semaphore reaching the first threshold value indicates completion of a first DMA transfer from the first set of consecutive DMA transfers, and the first semaphore reaching the second threshold value indicates completion of a last DMA transfer from the first set of consecutive DMA transfers.

8. The computer-implemented method of claim 6, wherein the first operation performed by the first computational engine is a last operation from a set of operations performed by the first computational engine that are dependent on the first set of consecutive DMA transfers.

9. The computer-implemented method of claim 5, wherein the first set of consecutive DMA transfers includes a number of DMA transfers that is less than a maximum value of the first semaphore, and the second set of consecutive DMA transfers includes a number of DMA transfers that is less than a maximum value of the second semaphore.

10. The computer-implemented method of claim 6, further comprising:

determining that all operations consuming data provided by the second set of consecutive DMA transfers have been performed;

resetting the second semaphore in response to determining that all operations consuming the data provided by the second set of consecutive DMA transfers have been performed, wherein resetting the second semaphore allows the second semaphore to be reused for a fourth set of consecutive DMA transfers in the DMA queue; and switching from the first semaphore back to using the second semaphore for the fourth set of consecutive DMA transfers, wherein switching back to using the second semaphore comprises incrementing, by the DMA engine, the second semaphore after performing each DMA transfer of the fourth set of consecutive DMA transfers.

11. The computer-implemented method of claim 10, wherein the first computational engine performs a third operation upon the second semaphore reaching a third threshold value, and wherein the second computational engine performs a fourth operation upon the second semaphore reaching a fourth threshold value.

12. The computer-implemented method of claim 10, wherein the first set of consecutive DMA transfers, the second set of consecutive DMA transfers, the third set of consecutive DMA transfers, and the fourth set of consecutive DMA transfers are triggered sequentially by a third computational engine, and wherein resetting of the first semaphore or the second semaphore is performed by the third computational engine by executing an instruction.

13. The computer-implemented method of claim 12, wherein:

the first computational engine is an activation engine of a neural network processor, the first operation produces output activations, the second computational engine is a processing engine (PE) array of the neural network processor, the second operation computes data that will be consumed by the activation engine to produce additional output activations, the third computational engine is a pooling engine of the neural network processor, and the pooling engine performs a pooling operation on the data computed by the second operation.

14. The computer-implemented method of claim 5, further comprising:

prior to resetting the first semaphore, incrementing, by the DMA engine, a third semaphore for the DMA queue after performing each DMA transfer of a fourth set of consecutive DMA transfers that is after the second set of consecutive DMA transfers and before the third set of consecutive DMA transfers in the DMA queue.

15. The computer-implemented method of claim 5, wherein the first semaphore or the second semaphore is a 16-bit register or a 32-bit register.

16. A non-transitory computer readable medium having stored therein program code that, when executed by one or more processors, causes the one or more processors to execute a compiler, the compiler performing operations including generating instructions for:
- triggering, by a first computational engine, sequential sets of consecutive DMA transfers in a DMA queue;
- performing, by a direct memory access (DMA) engine, the sequential sets of consecutive DMA transfers using the DMA queue;
- incrementing, by the DMA engine, a first semaphore for the DMA queue after performing each DMA transfer of a first set of consecutive DMA transfers in the DMA queue, wherein the first set of consecutive DMA transfers provides data to be consumed during operations by one or more computational engines, the one or more computational engines comprising a second computational engine;
- incrementing, by the DMA engine, a second semaphore for the DMA queue after performing each DMA transfer of a second set of consecutive DMA transfers that is after the first set of consecutive DMA transfers in the DMA queue;
- performing, by the second computational engine, a first operation after the first semaphore reaches a first threshold value for the first set of consecutive DMA transfers;
- determining, by the first computational engine based on completion of the second set of consecutive DMA transfers, that all operations consuming the data provided by the first set of consecutive DMA transfers have been performed, wherein the completion of the second set of consecutive DMA transfers indicates that enough time has passed for all operations consuming the data provided by the first set of consecutive DMA transfers, including at least the first operation, to be performed;
- resetting, by the first computational engine, the first semaphore in response to determining that all operations consuming the data provided by the first set of consecutive DMA transfers have been performed, wherein resetting the first semaphore allows the first semaphore to be reused for a third set of consecutive DMA transfers in the DMA queue; and
- switching from the second semaphore back to using the first semaphore for the third set of consecutive DMA transfers, wherein switching back to using the first semaphore comprises incrementing, by the DMA engine, the first semaphore after performing each DMA transfer of the third set of consecutive DMA transfers.

17. The non-transitory computer readable medium of claim 16, the operations performed by the compiler including generating additional instructions for:
- performing, by the second computational engine, a second operation after the second semaphore reaches a second threshold value for the second set of consecutive DMA transfers; and
- resetting, by the first computational engine, the second semaphore in response to determining that all operations consuming the data provided by the second set of consecutive DMA transfers have been performed, the operations consuming the data provided by the second set of consecutive DMA transfers including at least the second operation.

18. The non-transitory computer readable medium of claim 16, the operations performed by the compiler further including prior to generating the instructions:
- assigning the first semaphore and the second semaphore to the DMA queue for use with corresponding sets of consecutive DMA transfers, wherein the first set of consecutive DMA transfers or the third set of consecutive DMA transfers includes a number of DMA transfers that is less than a maximum value of the first semaphore, and the second set of consecutive DMA transfers includes a number of DMA transfers that is less than a maximum value of the second semaphore; and
- initializing the first semaphore and the second semaphore to a reset value.

19. The non-transitory computer readable medium of claim 16,
- wherein the instructions are executed by a neural network processor comprising the first computing engine, the second computing engine, and the DMA engine.

20. The non-transitory computer readable medium of claim 19,
- wherein the compiler is executed on a first host system, and wherein the neural network processor is part of a second host system.

* * * * *